United States Patent [19]
Ghaibeh

[11] Patent Number: 5,926,476
[45] Date of Patent: *Jul. 20, 1999

[54] NETWORK ARCHITECTURE FOR BROADBAND DATA COMMUNICATION OVER A SHARED MEDIUM

[75] Inventor: Gihad Ghaibeh, Redwood City, Calif.

[73] Assignee: Ericsson, Inc., Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/772,088

[22] Filed: Dec. 19, 1996

Related U.S. Application Data

[63] Continuation-in-part of application No. 08/677,160, Jul. 9, 1996.

[51] Int. Cl.$^6$ .............................. H04L 12/403; H04H 1/02
[52] U.S. Cl. ......................... 370/395; 370/449; 370/486; 348/7; 348/12
[58] Field of Search .................... 370/431, 432, 370/442, 443, 449, 458, 462, 408, 480, 485, 486, 489, 503, 395; 340/825.54, 825.08, 825.07; 348/6, 7, 12, 13; 455/3.1, 4.1, 4.2, 5.1

[56] References Cited

U.S. PATENT DOCUMENTS

| | | | |
|---|---|---|---|
| 5,274,841 | 12/1993 | Natarajan et al. | 370/337 |
| 5,317,571 | 5/1994 | Marcel et al. | 370/103 |
| 5,355,368 | 10/1994 | Dore et al. | 370/95.3 |
| 5,425,027 | 6/1995 | Baran | 370/449 |
| 5,426,636 | 6/1995 | Hiller et al. | 370/60 |
| 5,473,642 | 12/1995 | Osawa et al. | 370/449 |
| 5,563,883 | 10/1996 | Cneng | 370/449 |
| 5,572,517 | 11/1996 | Safadi | 370/449 |
| 5,596,577 | 1/1997 | Perreault et al. | 370/449 |
| 5,604,748 | 2/1997 | Date et al. | 370/449 |
| 5,754,535 | 5/1998 | Vandenabeele et al. | 370/347 |

OTHER PUBLICATIONS

C. Sierens et al.: "A First Description of the Hybrid Fiber Coax Concept in the Framework of the Acts Project ATHOC" IEE Colloquium on Optical and Hybrid Access Networks, Mar. 4–5, 1996, IPSWICH GB, pp. 18/1–18/5, XP002050372 see paragraph 3.

V. Vande Keere et al.: "Rapid Prototyping of a CATV Network Termination for ATM–Based Video–on–Demand Services" $7^{th}$ IEEE International Workshop on Rapid System Prototyping, 19–21 7/96, Thessaloniki GR, pp. 44–49, XP002050373 see par. 3.2–para 4.4.

J.E. Dail et al.: "Adaptive Digital Access Protocol: Mac Protocol for Multiservice Broadband Access Networks" IEEE Comunications Magazine, vol. 34, No. 3, Mar. 1996 N.Y.US, pp. 104–112, XP000557382.

Bisdikian, C: "MLAP: A MAC Level Access Protocol for the HFC 802.14 Network" IEEE Communications Magazine, vol. 34, No. 3, Mar. 1, 1996, pp. 114–121, XP000557383.

*Access to B–ISDN via PONS: ATM Communication in Practice*, edited by ulrich Killat, pub. by Wiley and Teubner, 1996, pp. I–XX, 1–308.

Primary Examiner—Chau Nguyen
Assistant Examiner—Soon-Dong Hyun
Attorney, Agent, or Firm—Lyon & Lyon LLP

[57] ABSTRACT

Network architectures and data communication protocols for supporting both downstream and upstream transport of digital data between a headend facility and multiple downstream network terminals over a shared communication medium include downstream framing protocols compatible with DAVIC/DVB modem transmission framing synchronization and FEC standards at the physical layer. The downstream data frames are formed by two or more repeating pairs of DVB compatible frame slots, wherein each downstream frame is transmitted over the same interval, e.g., 250 μsec in preferred formats, regardless of the number of DVB slot pairs it contains. All downstream frame rates are supported by a single upstream data rate. Upstream bandwidth is allocated based on a selected set of operating criteria and service type priorities, based on both a polling basis and a contention basis, on one or more in-band RF carrier channels. Low delay services such as synchronous telephony are provided with requisite delivery and priority.

20 Claims, 15 Drawing Sheets

NETWORK ARCHITECTURE FOR BROADBAND DATA COMMUNICATION OVER A SHARED MEDIUM

RELATED APPLICATION DATA

This application is a continuation-in-part of U.S. application Ser. No. 08/677,160 filed Jul. 9, 1996, and entitled "Protocol for Broadband Data Communication Over a Shared Medium."

FIELD OF THE INVENITON

The present invention pertains to the field of communication networks, including apparatus and data transmission protocols for the transport of digital data over a shared broadband communication medium.

BACKGROUND OF THE INVENTION

In most modern telecommunication networks, a community of subscribers are connected to a central office switch through a "two-way" distribution network, which may include one or more transmission facilities, e.g., microwave, optical, electrical, etc., and which may utilize both analog and digital baseband transmission protocols. By way of example, subscribers associated with a respective central office switch may be connected to the switch via a series of remotely located network units, with each network unit serving subscribers in a defined local area. Between the central office switch and each network unit, telecommunication signals are commonly digitized and multiplexed for transport over relatively high bandwidth facilities for greater network efficiency. More recently, digital transmission of telecommunication signals may span all the way between a central office switch and a digital network termination point at a subscriber premise location.

In addition to basic analog or digital telephony, other types of services may also be provided over a traditional telecommunication network. For example, it is well known to use a digital/analog "modem" (modulator/demodulator) for transporting digital data over a telecommunication network via (relatively low frequency) analog modulation. Analog carriers are also generally the transport mode of choice in many high bandwidth networks, such as video broadcast networks. For example, in a typical cable television ("CATV") broadcast network, a broadcast communication signal is transmitted "downstream" from a headend broadcast facility to a community of subscribers over a coaxial cable distribution network via RF carrier channels covering a wide (relatively high) frequency bandwidth— e.g., between 50 and 800 MHz.

In addition to the one-way, downstream distribution of the video broadcast signals, it is desirable in a CATV broadcast distribution network to be able to transmit and receive—i.e., in both the downstream and "upstream" directions,— information such as, e.g., network operations, administration and maintenance ("OAM") data, or "set-top" data. As used herein, "set-top" data refers generally to information transmitted to or from CATV control circuitry, which is traditionally located in a box-like unit placed on top of a subscriber's television set, hence the "set-top" designation, although more recently the control circuitry is incorporated within the television set itself. Downstream set-top data may include, for example, an instruction sent from the CATV service provider to activate or deactivate subscriber CATV service, or to authorize additional channel reception within the RF channel spectrum of the broadcast signal. Another example of downstream set-top data may include "polling" information to collect data on usage, e.g., for ratings or billing purposes. Upstream data sent from the subscriber set-top circuitry to the service provider, sometimes referred to as "set-top telemetry" data, may include a response to downstream polling, or a video-on-demand subscriber service request.

It is presently anticipated that several new services will arise requiring both point-to-point and point-to-multipoint transmission of independent communication signals, including a full range of digital baseband services. In addition to the desirability of combining traditional (i.e., synchronous) telecommunication and CATV services over a single distribution network, it is also desirable for such a network to fully support the two-way transport of multiple "broadband" data services, such as asynchronous transfer mode ("ATM") data packets, or "cells." Generally, it is anticipated that ATM cells will be used to transport digital data comprising one or more communication services, wherein the cells are periodically assembled and transmitted from a sending node and received and disassembled at a receiving node. ATM transmission is particularly advantageous in that it enables the transport of multiple services over a single communication path, wherein bandwidth utilization may be optimized as a function of the statistical activity of each individual service—i.e., wherein the services are "bursty" in nature, so that bandwidth is efficiently shared.

For example, bursty data traffic may include local area network ("LAN") traffic, which is traditionally limited to private, or closed-loop networks, but may be more frequently carried over shared public access (e.g., telecommunication) networks for greater efficiency in connecting multiple LAN locations. Further, with the explosion of recent interest in services associated with the "Internet", demand for low cost, high speed two-way digital data transport is at an all time high.

Given the wide variety of potential broadband communication services to be supported over a single, shared communication network, it is desirable to provide an efficient digital data transmission protocol for both downstream and upstream communication paths. Such a data transmission protocol should preferably be compatible with existing modem transmission standards, such as DAVIC and DVB standards, and should most fully utilize the available carrier channel bandwidth. It should also conform with applicable ATM transmission protocols.

The use of a coaxial distribution network to support a broadband data services network is desirable in that it is cost effective to use existing embedded plant, e.g., an existing CATV distribution network. Further, coaxial cable distribution provides a relatively inexpensive mode for transporting high frequency communication signals, e.g., as opposed to twisted copper pair. However, because of the physical attributes of known coaxial distribution networks, transport capacity problems may arise due to transient noise, etc. Further, broadband data services being provided in addition to CATV broadcast and two-way telecommunication signals will have to contend for limited availability of bandwidth channels.

Thus, it is desirable to provide a data communication protocol that will dynamically and adaptively allocate limited network bandwidth to a number of communication nodes sharing a common communication medium, such as a relatively "noisy" coaxial distribution network, while simultaneously supporting multiple types of ATM data traffic, including bursty data such as LAN traffic, as well as synchronous, or "continuous bit rate" ("CBR") telephony traffic.

SUMMARY OF THE INVENTION

The present invention provides network architectures and data communication protocols for supporting both downstream and upstream transport of digital data between a headend facility and multiple downstream network terminals ("NTs") over a shared communication medium, such as a coaxial distribution network.

In a preferred embodiment, the headend facility includes a central HeadEnd Media Access Control unit ("HEMAC"), which communicates with respective Media Access Control ("MAC") units located in each NT. Digital data is presented to the HEMAC and respective NT MAC units via dedicated service interfaces, such as, e.g., CBR telephony, ATM, or LAN data interfaces at each location.

Between the HEMAC and the respective NT MAC units, "downstream" data (i.e., from the headend to the NTs) is transmitted in continuous serial data frames over a common RF carrier frequency, wherein all downstream data frames are received by all NTs associated with the respective downstream RF carrier channel. The NTs evaluate each downstream data frame, e.g., based on destination or broadcast address fields, to determine whether it is an intended recipient of data contained therein. "Upstream" data (i.e., from an NT to the headend) is packetized in ATM cells and transported in respective data frames from individual NTs in TDMA slots over a shared upstream RF carrier channel that is separate from the downstream carrier channel.

The downstream data frames are preferably compatible with DVB modem transmission framing synchronization and forward error correction ("FEC") standards at the physical layer, and support a full range of 16 to 256 quadrature amplitude modulation ("QAM") transmission rates in both 6 MHz and 8 MHz channels. Preferably, selected downstream transmission rates are in multiples of 8 Khz (i.e. 125 μsec) to accommodate basic rate (i.e., CBR) telephony traffic. For example, in a presently preferred embodiment, downstream frames are formed by two or more repeating pairs of DVB compatible frame slots, wherein each downstream frame is transmitted over a 250 μsec interval, regardless of the number of DVB slot pairs it contains.

All downstream frame rates are preferably supported by a single upstream data rate. In particular, upstream frame transmission timing is identical to the downstream frame transmission timing—, i.e., each upstream frame is also transmitted over a 250 μsec interval in a presently preferred embodiment, regardless of its payload size. An individually calculated upstream transmission delay is preferably imposed at each NT so that the upstream frames are received serially at the headend facility at the same interval timing as the downstream frames are being transmitted.

In accordance with a general aspect of the invention, the HEMAC allocates upstream bandwidth to respective NTs based on a selected set of operating criteria and service type priorities. In addition to a data "payload", each downstream data frame includes an upstream bandwidth "permit" that, depending on the type of permit issued in a given downstream frame, allows for one or more respective NTs to transmit an upstream bandwidth "request" in a corresponding upstream data frame. Generally, permits are issued by the HEMAC on both a "polling" basis, i.e., wherein a permit is targeted to a specific NT, as well as a "contention" basis, i.e., wherein one or more NTs may vie for an available upstream request slot. In presently preferred embodiment, permits are also issued based on specific types of upstream data to be transmitted, whereby priority may be given to certain services requiring low cell delay variation ("CDV"), such as CBR telephony traffic. Permit types also include "sign-on" permits for allowing newly activated NTs to make their presence known to the HEMAC, and "ranging" permits for allowing the HEMAC to determine, and adjust for, respectively, the requisite transmission delay for a respective NT.

Because upstream frame transmission is provided in TDMA frames corresponding on a one-to-one basis with downstream TDMA frames, only one permit is provided in each respective downstream frame per upstream carrier channel. In accordance with another general aspect of the invention, upstream network capacity may be expanded by providing one or more additional upstream RF carrier channels. In this manner, respective groups of NTs simultaneously transmit upstream on separate carrier channels in response to separate permits issued by the HEMAC in the same downstream frame.

Thus, a general object of the invention is to provide a data transmission protocol that allows the HEMAC to control the two-way transport of multi-priority ATM cells between the headend facility and respective NTs by providing real-time allocation of the various permit types, depending upon actual demand and service priority.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
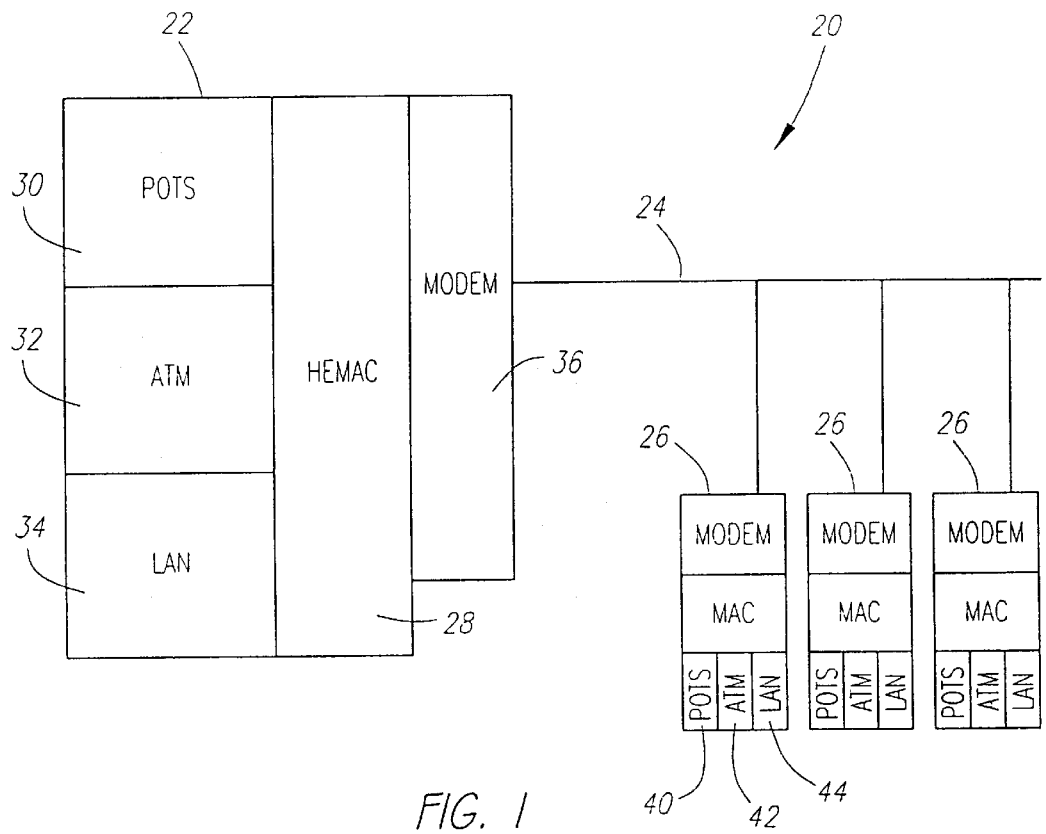
FIG. 1 is a block diagram of an exemplary broadband communication network employing a coaxial distribution network for transmitting data between a headend facility and multiple network terminals.

Referring to FIG. 1, a broadband communication network 20 includes a headend facility 22, which transmits and receives digital data over a coaxial distribution network 24 to and from, respectively, multiple network terminal nodes (NTs) 26. The headend facility 22 includes a HeadEnd Media Access Controller (HEMAC) 28, which controls the transport of various digital data streams between the headend facility 22 and the respective NTs 26. For purposes of illustration, the headend 22 is shown equipped with a synchronous telephony (POTS) interface 30, an ATM packet interface 32 and a LAN data interface 34, each of which individually transmit and receive digital data to and from, respectively, the headend 22.

The headend 22 is also equipped with a modem 36 for RF carrier modulating downstream data signals over the coaxial distribution network 24 on a selected RF carrier channel to all NTs 26 associated with that channel. The modem 36 also demodulates RF carrier modulated upstream data received from respective NTs 26 on one or more upstream RF carrier channels that are separate from the respective downstream data channel. In preferred embodiments, the coaxial distribution network 24 is limited to network "trees" having no more than three amplifiers (not shown) along any one route, i.e., from the headend facility 22 to a given NT 26, in order to limit the impact of transient noise and distortion on the respective downstream and upstream communication signals.

Each NT 26 is equipped with its own Media Access Controller (NT MAC) 38 for handling various digital data streams transmitted between the respective NT 26 and the headend facility 22. Each NT 26 preferably supports one or more of the digital data services handled by the headend facility 22. For example, in the illustrated preferred embodiment, each NT 26 is equipped with a CBR telephony (POTS) interface 40, an ATM interface 42 and a LAN data interface 44, respectively, each which individually transmit and receive digital data to and from the respective NT 26. As will be apparent to those skilled in the art, there is no requirement that any given NT 26 be equipped to handle all of the particular data services supported by the headend 22. Each NT 26 is equipped with its own modem 46, which demodulates downstream data signals received from the headend 22 for processing by the NT's MAC 38. The NT modem 46 also modulates respective upstream data signals for transmission to the headend 22 over the coaxial distribution network 24 on a different respective RF carrier channel.

Figure 2:
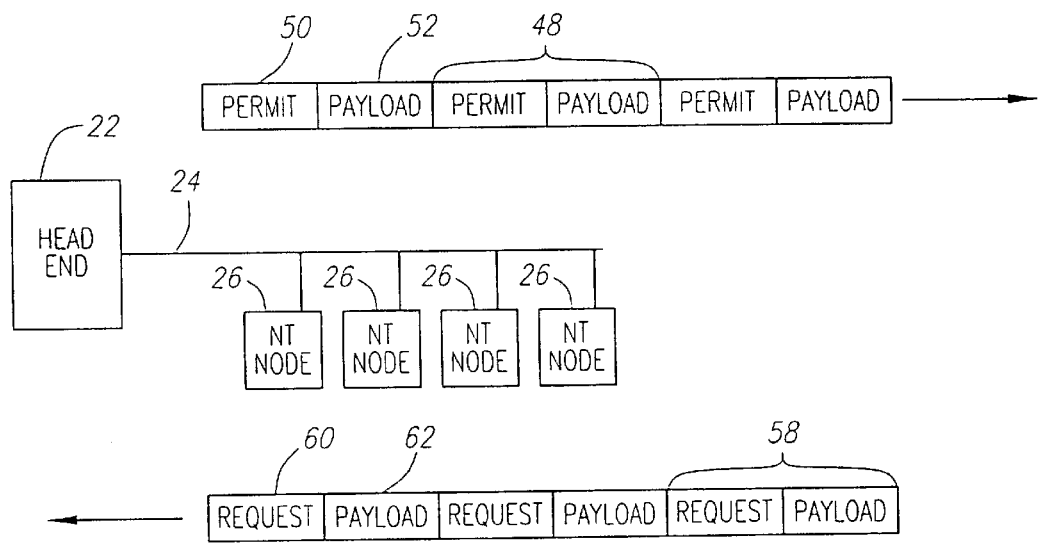
FIG. 2 is a block diagram depicting the respective downstream and upstream transmission of digital data frames in the communication network of FIG. 1.

Referring to FIG. 2, downstream data is transmitted from the headend 22 in continuous (serial) downstream data frames 48, which generally include an upstream bandwidth "permit" 50 and payload data 52. In order to dynamically assign upstream transmission bandwidth, the HEMAC 28 issues the upstream bandwidth permits 50 on a "one permit per downstream frame"basis for each utilized upstream carrier channel. As described in greater detail below in conjunction with FIGS. 5–8, the permits 50 are carried in a MAC overhead section of each downstream data frame 48. In accordance with a general aspect of the invention, upstream bandwidth permits are allocated by the HEMAC 28 on either a reserved or "polling" basis, or on a "contention" basis. As described in greater detail below in conjunction with FIGS. 16–18, a "scheduled" basis is also employed by the HEMAC 28 for upstream bandwidth permit allocation for certain low CDV services, such as CBR telephony traffic.

As will be apparent to those skilled in the art, an advantage of "reservation mode" permits is that they are "collisionless" and may thus be used by the HEMAC 28 to reserve a portion of the available upstream bandwidth for a given carrier channel exclusively for one or more specifically targeted NTs 26 on a predetermined basis. Reservation mode permits are thus advantageous in heavy network traffic conditions in that they insure that all NTs 26 have at least some opportunity to transmit upstream data. On the other hand, "contention mode" permits allow one or more NTs 26 needing to request upstream bandwidth to "contend" for an available upstream transmission slot. Thus, contention mode permits are especially advantageous in networks containing a relatively large number of NTs 26, wherein a "polling only" protocol would take too long in finding particular NTs 26 needing to request upstream bandwidth, and would waste bandwidth in the process by necessarily polling uninterested NTs 26. However, because contention mode permits result in collisions between responding NTs 26, they are far more effective in light network traffic conditions than in heavy network traffic conditions.

In accordance with a general aspect of the invention, both contention mode and reservation mode permits allow a NT 26 to "request" additional upstream bandwidth, i.e., for transmission of upstream data comprising one or more service types of varying priorities. A variation of a reservation mode permit includes a "scheduled mode" permit that is used to assign a specific, fixed amount of upstream bandwidth to a given NT 26, e.g., for a handling low CDV telephony traffic carried in substantially evenly spaced upstream ATM cells.

Each NT 26 associated with the respective downstream carrier channel receives and evaluates each downstream frame 48 to determine whether it is an intended recipient of either an enclosed permit 50, or of some or all of the payload data 52 contained therein. An NT 26 may thereafter respond to a permit 50 contained in a downstream frame 48 by attaching a header containing a "request" slot 60 to an upstream ATM payload cell 62 to , to thereby form an upstream data frame 58, which is then transmitted upstream by the NT 26 to the HEMAC 28. Although upstream frames 58 may differ significantly in bit-size and, thus, data rate from the downstream frames 48, they are still transmitted and received, respectively, at the same interval timing. As explained in greater detail herein, the varying upstream transmission distances between the NTs 26 is compensated for by imposing a calculated transmission delay at each respective NT 26, i.e., depending on its respective distance from the headend 22. In this manner, upstream data frames 58 arrive serially at the headend 22—i.e., without interfering with each other—in successive intervals corresponding to the respective downstream transmission interval of the headend 22.

Figure 3:
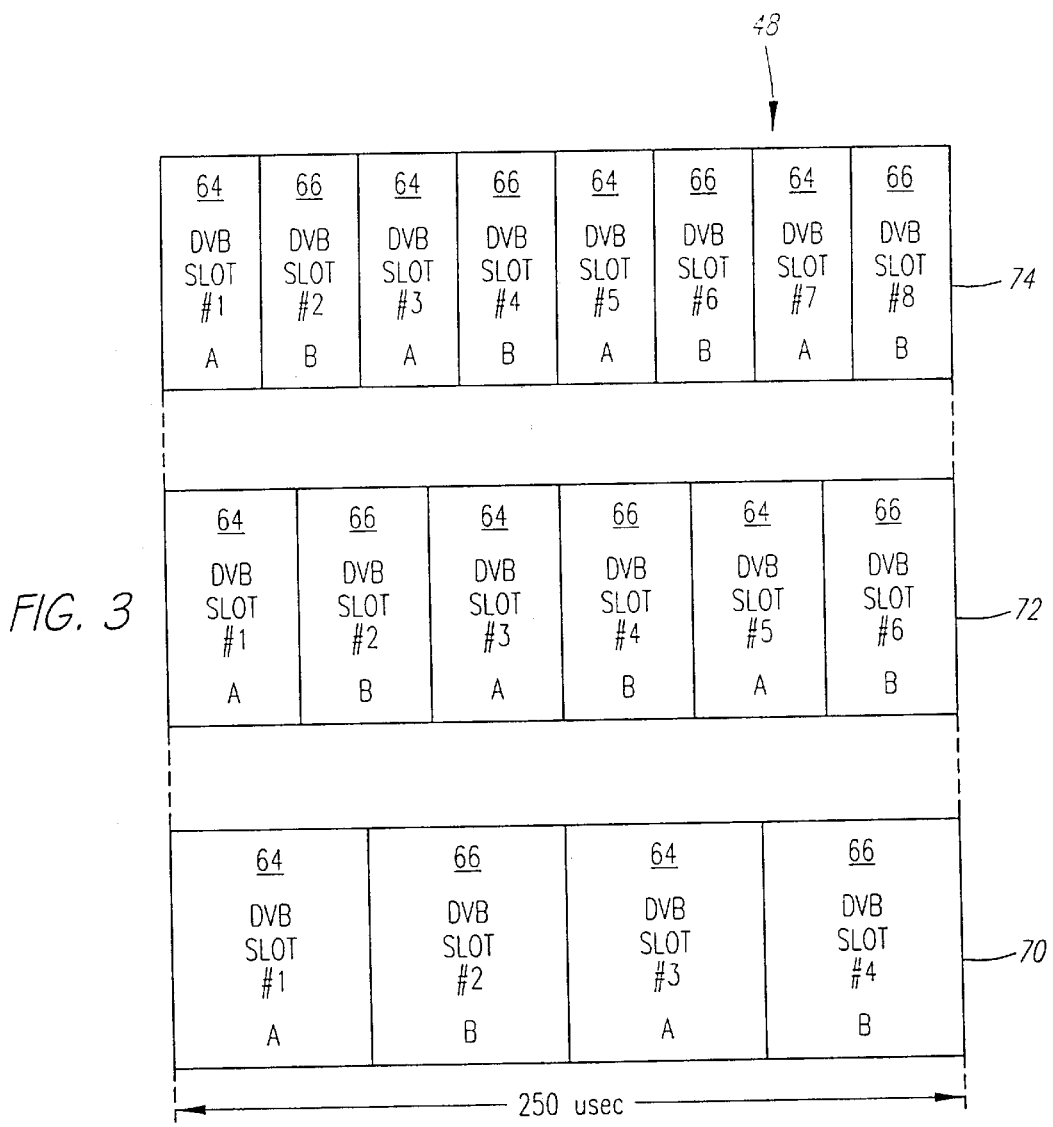
FIG. 3 is a block diagram of preferred downstream data frame formats employing alternate DVB framing slot configurations.

Referring to FIG. 3, the downstream data frames 48 are configured to be compatible with existing DVB modem transmission framing and forward error correction ("FEC") standards at the physical layer. In accordance with another general aspect of the invention set forth herein, preferred downstream data frames 48 are formed by even pairs of DVB compatible frame slots ("DVB slots"), designated as "A" and "B", respectively, wherein each successive downstream data frame 48 is transmitted from the headend 22 during a 250 μsec interval, regardless of the number of DVB slot pairs it contains. Exemplary preferred downstream frame configurations include a first frame 70 comprising a double DVB slot pair (i.e., with four total DVB slots), a second frame 72 comprising a triple DVB slot pair (i.e., with six total DVB slots), and a third frame 74 comprising a quadruple DVB slot pair (i.e., with eight total DVB slots), respectively, wherein each of the respective DVB slot pairs "A-B" in each of the frame configurations 70, 72 and 74 are identical.

Figure 4:
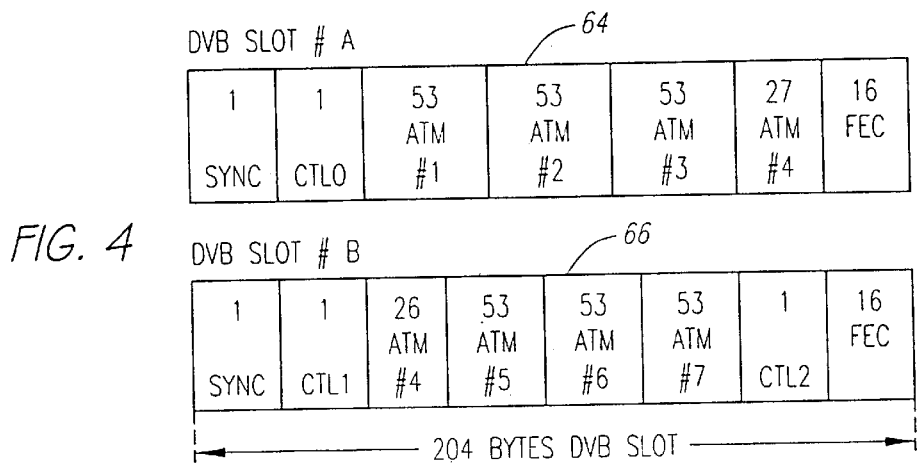
FIG. 4 is a block diagram of a preferred DVB framing slot pair for use in the preferred downstream data frame formats of FIG. 3.

Referring to FIG. 4, in conformance with DVB modem frame transmission standards, DVB slots A and B each comprise two hundred and four data bytes, wherein the respective A-B slot pairs are transmitted serially by the headend 22, i.e., from left to right. In particular, DVB slot "A" (64) of each A-B pair is formed by an initial synchronization ("sync") byte, which is followed by a first control byte ("CTL0"), three successive fifty-three byte ATM cells (#s 1–3), the first twenty-seven bytes of a fourth ATM cell (#4), and sixteen bytes of FEC information, respectively. DVB slot "B" (66) also begins with a synch byte, which is followed by a second control byte (CTL1), the remaining twenty-six bytes of ATM cell (#4), three additional fifty-three byte ATM cells (#s 5–7), a third control byte (CTL2), and sixteen bytes FEC information, respectively.

Thus, as can be calculated from the respective DVB slot pair configurations, and based on the preferred downstream frame transmission timing of 250 μsec, the four DVB slot downstream frame 70 provides a transmission rate of 26.112 Mbps, which is compatible for DVB modem transmission at either 64 QAM in a 6 MHz channel or at 16 QAM in a 8 MHz channel; the six DVB slot downstream frame 72 provides a transmission rate of 39.168 Mbps, which is compatible for modem transmission at either 256 QAM in a 6 MHz channel or at 64 QAM in an 8 MHz channel; and the eight DVB slot downstream frame format 74 provides a transmission rate of 52.224 Mbps, which is compatible for modem transmission at 256 QAM in an 8 MHz channel, respectively.

In preferred embodiments, a sixty-eight byte upstream data frame 58 (not shown in FIG. 4) is employed, which provides an upstream data rate of 2.176 Mbps, based on the preferred 250 μsec upstream transmission interval. This upstream data frame length is advantageously evenly divisible into any of the aforementioned exemplary preferred downstream frame format rates—i.e., at a 12:1 ratio with respect to the four DVB slot frame 70; at an 18:1 ratio with respect to the six DVB slot frame 72; and at a 24:1 ratio with respect to the eight DVB slot frame 74, respectively. Various preferred upstream frame configurations are described in greater detail in conjunction with FIGS. 9–15.

Figure 5:
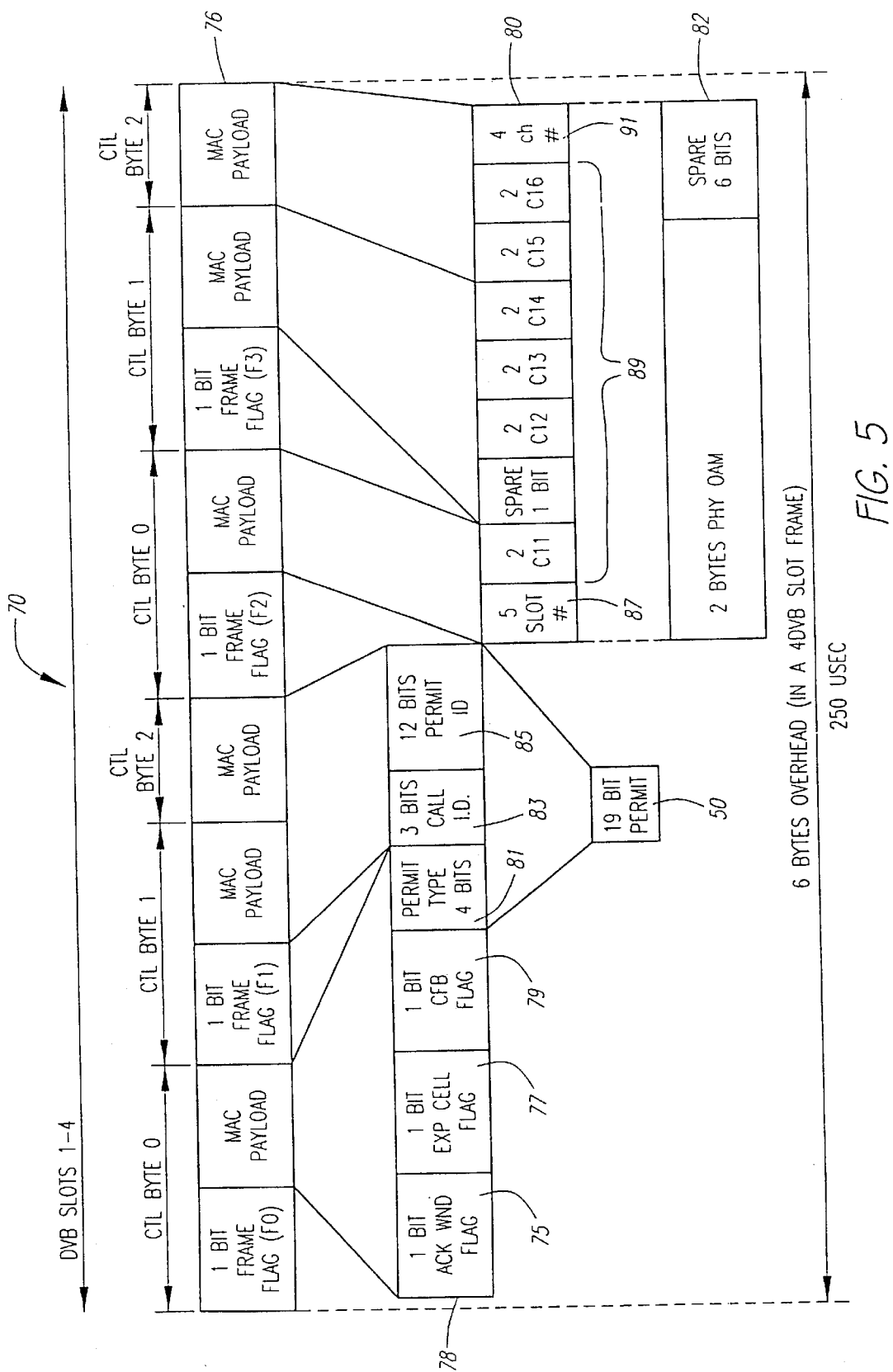
FIG. 5 is a block diagram of a preferred MAC control byte allocation in a four DVB framing slot downstream data frame.

Referring to FIG. 5, a four DVB slot downstream frame 70 is depicted with the respective sync, ATM cell and FEC bytes omitted for purposes of illustrating a preferred control byte configuration. In accordance with yet another general aspect of the invention set forth herein, the respective control bytes retain their DVB standard position, but their content has been altered for purposes of upstream bandwidth allocation by the HEMAC 28. In particular, control bytes CTL0-2 of the first DVB slot pair (i.e., DVB slots "one" and "two") are serially aligned with the respective control bytes CTL0-2 of the second DVB slot pair (i.e., DVB slots "three" and "four") to form a six byte control subframe 76. The control subframe 76 is used to carry MAC overhead from the HEMAC 28 to the respective NT MACs 38, including the respective upstream transmission permits 50 used by the HEMAC 28 to assign upstream bandwidth to respective NTs 26.

With respect to the first DVB slot pair of the control subframe 76, control byte CTL0 includes a first (one bit) frame flag F0 and seven bits MAC payload data; control byte CTL1 includes a second (one bit) frame flag F1 and seven bits MAC payload data; and control byte CTL2 includes eight bits MAC payload data, respectively. The collective twenty-two bits of MAC payload data from these first three control bytes CTL0-2 form a MAC control data field 78. The MAC control data field 78 includes three indicator bit flags: an acknowledge window flag 75, an ATM expansion channel indicator flag 77 and a collision feedback indicator flag 79, respectively, followed by a nineteen bit upstream transmission permit 50. As illustrated in greater detail below, the flag 75 is used to mark the beginning of a new series of downstream data frames 48 for tracking downstream data transmission; flag 77 is used to indicate whether an ATM expansion cell 96 (explained in conjunction with FIG. 8) is used in the present downstream data frame 48; and flag 79 is used to indicate whether collision feedback information is present in data field 80 (explained below).

The permit field 50 includes a four bit "permit type" field, a three bit "call ID" field and a twelve bit "permit ID" field, respectively. In particular, the permit type field 81 distinguishes between different "types" of upstream data to be transmitted by a respective NT 26 in response to receiving the permit 50. In a currently preferred embodiment, upstream transmission data types include constant bit rate ("CBR"), variable bit rate ("VBR") and unassigned bit rate ("UBR") services, respectively, each of which are transported in a standard ATM cell format. The permit type field 81 is also used to indicate the type of upstream transmission that is offered, i.e., whether it is a reserved slot or whether it may be contended for by some or all of the NTS 26. The call ID field 83 is used to identify a specific calling channel or line for CBR service at a specified NT. The permit ID field 85 is used to identify a specific NT 26, or group of NTs, if applicable, that may respond to the permit. A more detailed description of the permit type 81, Call ID 83, and permit ID 85 fields is provided below in conjunction with FIGS. 9–18.

In the second DVB slot pair of frame 70, control byte CTL0 includes a third (one bit) frame flag F2 and seven bits MAC payload data; control byte CTL1 includes a fourth (one bit) frame flag F3 and seven bits MAC payload data; and control byte CTL2 includes eight bits MAC payload data, respectively. The collective twenty-two bits MAC payload data of the second DVB slot pair may be used to carry either a twenty-one bit collision feedback information field 80 (with one bit spare) or, alternately, a two byte OAM data field 82 (with six bits spare). If a collision feedback data field 80 is being transmitted, the flag 79 is set (i.e., with a "1"); otherwise an OAM data field 82 is presumed.

In particular, a collision feedback data field 80 contains a five bit slot identification number 87, followed by six, two-bit collision identification flags 89, and a four bit channel identification number 91, respectively, the use of which is described in greater detail below, in conjunction with FIG. 9. An OAM data field 82 is used for transporting two bytes of OAM data from the headend facility 22 to respective NT locations 26. In a presently preferred embodiment, a protocol for using the OAM data field 82 is left open as a design choice by the network implementor.

Figure 6:
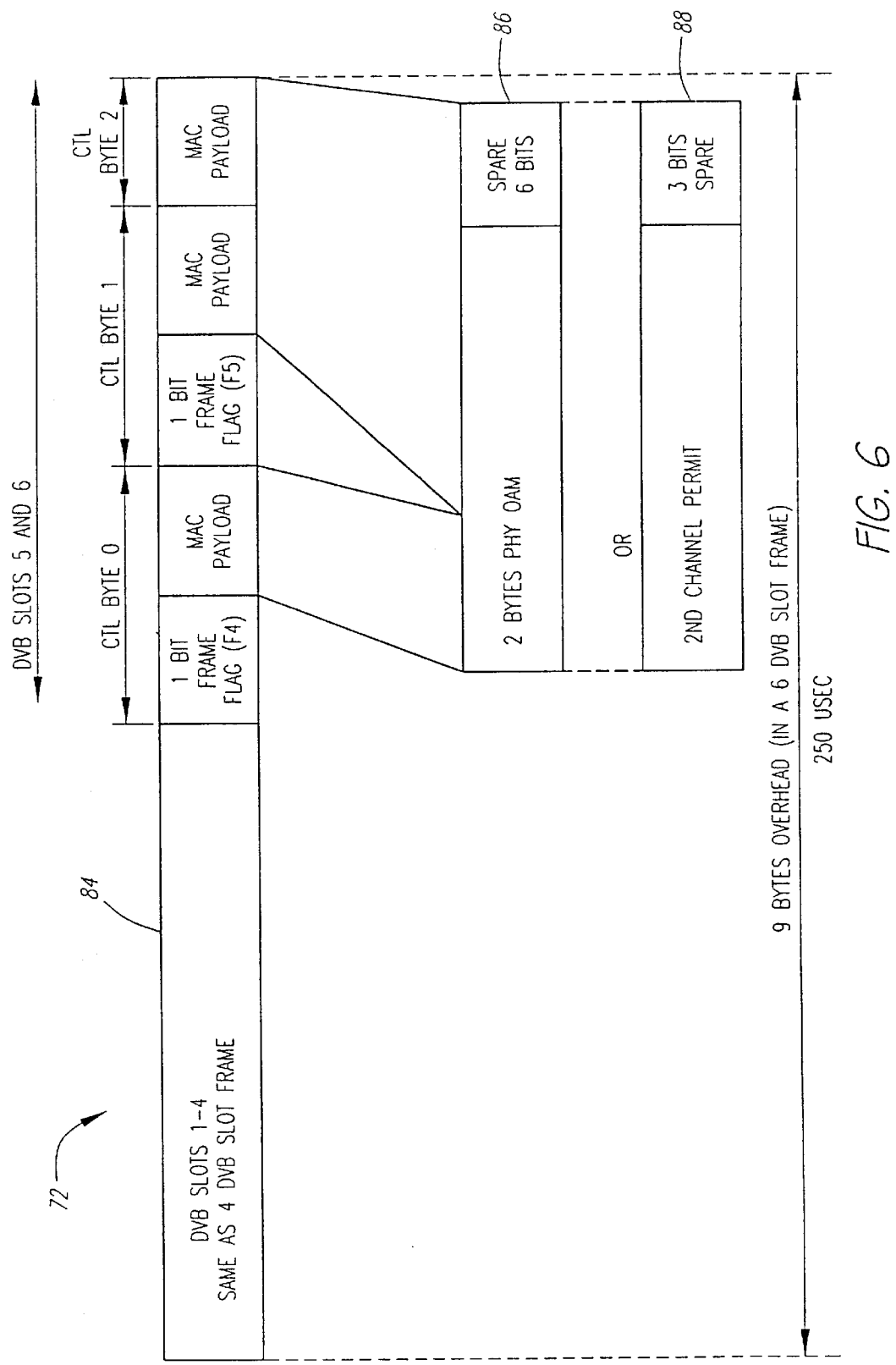
FIG. 6 is a block diagram of a preferred MAC control byte allocation in a six DVB framing slot downstream data frame.

Referring to FIG. 6, a six DVB slot downstream frame 72 is also depicted without the sync, ATM cell and FEC bytes, respectively, wherein the collective nine control bytes of frame 72 form an "expanded" control subframe 84. The first six control bytes (i.e., from the first four DVB slots) of the expanded control subframe 84 are allocated in the exact manner as in control subframe 76 of FIG. 5, including a nineteen bit upstream transmission permit 50.

In accordance with yet another general aspect of the invention, only one permit field 50 is used in each downstream data frame per upstream RF carrier channel. Thus, if only a single upstream carrier channel is employed in network 20, the remaining three control bytes of subframe 84 (i.e., control bytes CTL0-2 of DVB slots "five" and "six"), which also includes fifth and sixth (one bit) frame flags F4 and F5, respectively, are used for other purposes, such as for an additional two byte OAM data field 86. It may be desirable to expand upstream network capacity by utilizing an additional RF carrier channel for upstream frame transmission—i.e., where a first group of NTs 26 are associated with a first selected upstream RF carrier channel and a second group of NTs 26 are associated with a second selected upstream RF carrier channel, respectively. In this case, the final three control bytes of expanded control subframe 84 are used to transmit a nineteen bit "second channel" upstream transmission permit 88, which comprises a respective four bit permit type field, three bit call ID field, and a twelve bit "permit ID" field, (not shown), respectively, for a second upstream RF carrier channel.

Figure 7:
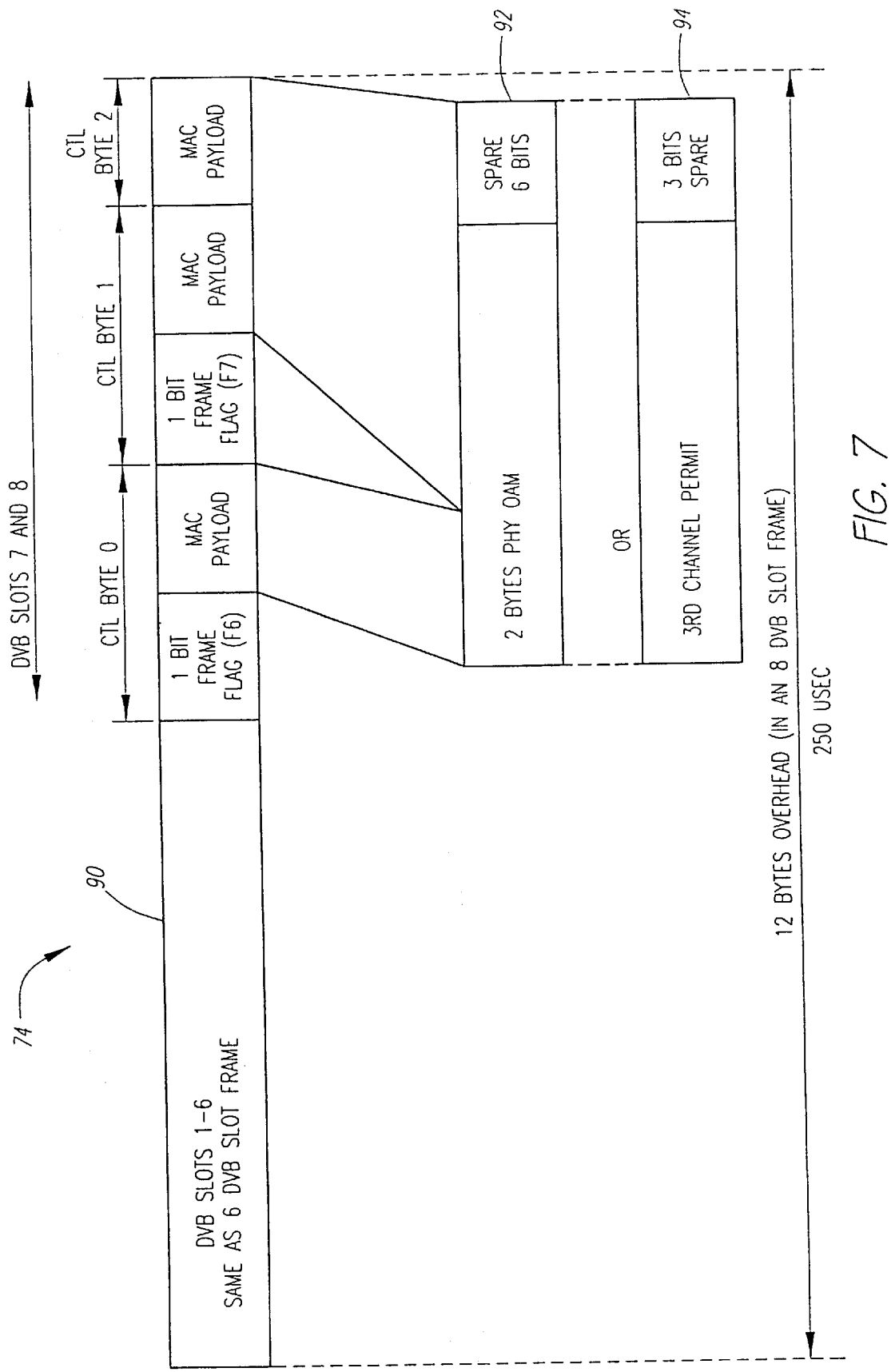
FIG. 7 is a block diagram of a preferred MAC control byte allocation in an eight DVB framing slot downstream data frame.

Referring to FIG. 7, capacity for yet another upstream carrier channel is provided by employing an eight DVB slot downstream frame 74, wherein the collective twelve control bytes of frame 74 form a "further expanded" control subframe 90. The first nine control bytes (i.e., from the first six DVB slots) of the further expanded control subframe 90 are allocated in the exact manner as in the expanded control subframe 84 of FIG. 6,—i.e., including a first channel permit 50 and either an (additional) OAM data field 86 or a second channel permit 88, respectively. The remaining three control bytes (i.e., control bytes CTL0-2 of DVB slots "seven" and "eight"), are used to transmit yet another two byte OAM data field 92, or a nineteen bit "third channel" upstream transmission permit 94. The third channel permit 94 includes a respective four bit permit type field, three bit call ID field, and a twelve bit "permit ID" field, (not shown), for a third upstream RF carrier channel. The final three control bytes of subframe 90 also include seventh and eighth (one bit) frame flags, F6 and F7, respectively.

Figure 8:
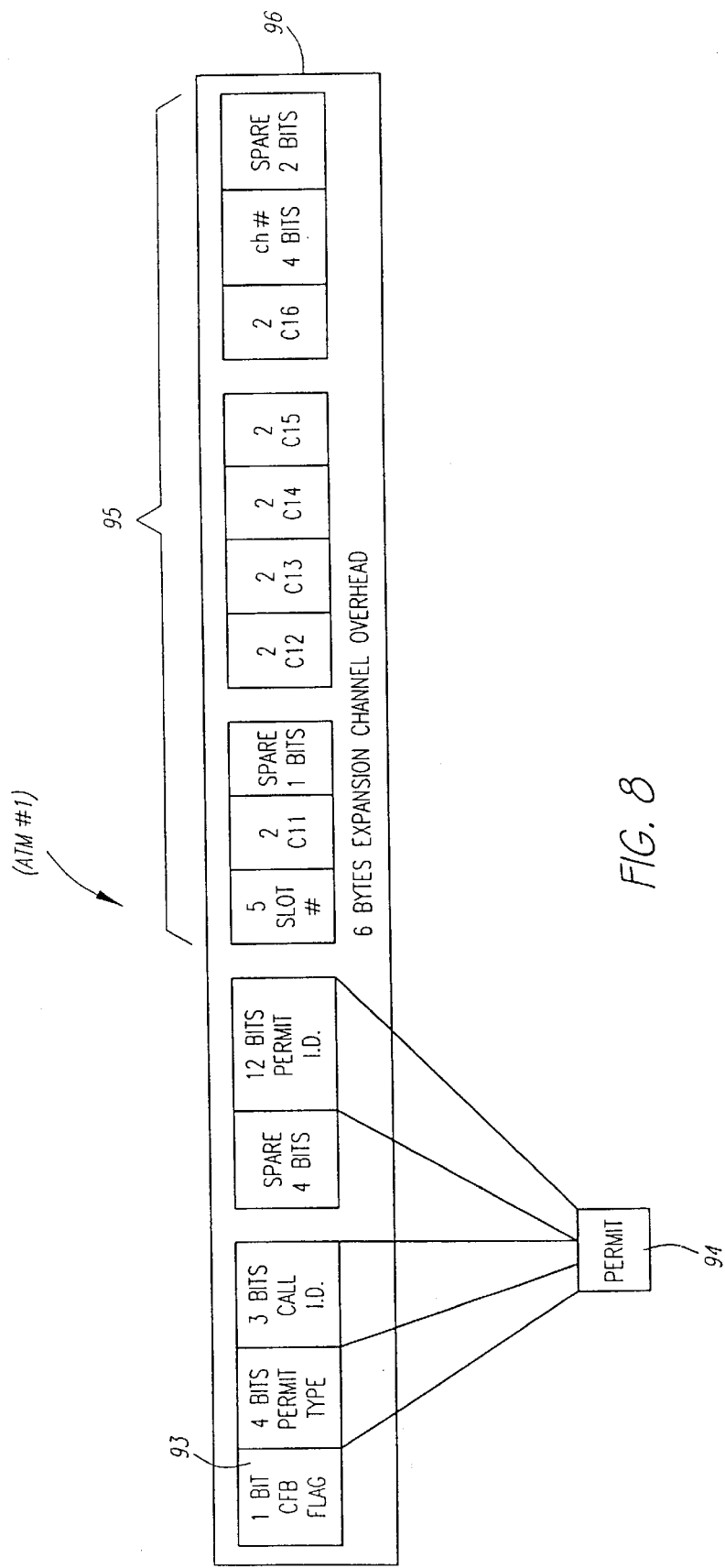
FIG. 8 is a block diagram of preferred MAC control byte allocation in a six byte ATM expansion channel.

Referring to FIG. 8, additional upstream carrier channels may also be controlled by expanding into the space starting after the first five bytes of the first ATM cell—i.e., ATM cell #1 in DVB slot "one"—of the respective downstream frame 48. In particular, a six byte ATM "expansion channel" 96 is allocated in a manner similar to the six byte control subframe 76 depicted in FIG. 5, except that no framing bits are needed. Up to eight, six byte control subframes may be added to the first ATM cell following the excluded first five bytes. The use of an ATM expansion channel 96 is indicated by setting flag 77 in the MAC control field 78 of the first DVB slot of the respective frame 48. In a presently preferred embodiment, a six byte expansion channel 96 includes a further one bit collision feedback flag 93, a further channel upstream permit 94, and an associated collision feedback data field 95, respectively. The further upstream permit 94 is identical in format to permit 50, and may be used as an alternate second or third channel permit—i.e., where only a four or six DVB slot frame configuration is employed. Likewise, the collision feedback data field 95 is identical in format to field 80, wherein use of field 95 is indicated by setting flag 93.

Although the use of multiple upstream channels is thus provided for in the present preferred embodiment, for purposes of ease in illustration, only a single upstream channel—i.e., associated with the 1st channel permit 50—will be illustrated in conjunction with the remaining drawings, unless otherwise indicated.

Figure 9:
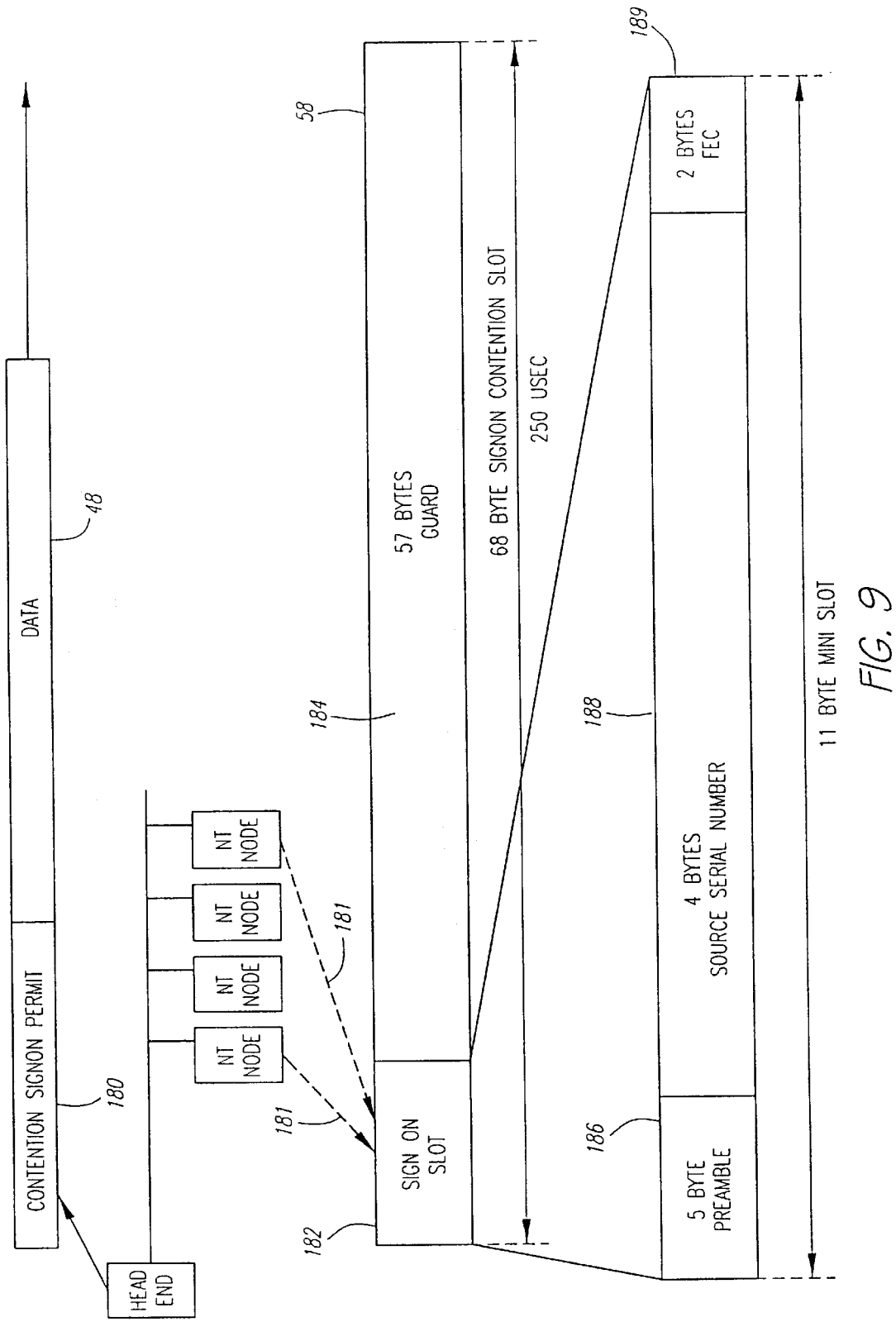
FIG. 9 is a block diagram of a preferred upstream data frame transmitted in response to a contention sign-on permit.

Referring to FIG. 9, in order to determine if any new NTs 26 have been activated in the network 20, the HEMAC 28 periodically transmits a downstream contention "signon" permit 180 for each active upstream carrier channel. In particular, referring back to FIG. 5, the HEMAC 28 inserts a selected four bit binary code in the permit type field 81 of permit 50 to indicate that the permit is for a responsive signon slot, and a selected twelve bit binary code in the permit ID field 85 (i.e., "all NTs"), which indicates that any NT 26 may attempt a response. In this manner, a newly activated NT 26 will recognize a contention signon permit 180 and will attempt an upstream response thereto.

Referring back to FIG. 9, as indicated by dashed lines 181, more than one NT 26 can respond to a signon contention signon permit 180,—i.e., it is a contention mode permit. However, preferably only those newly activated NTs 26, i.e., those NTs whose signon has not yet been acknowledged by the HEMAC 28, will attempt a response. More particularly, an NT 26 responding to a signon permit 180 transmits an eleven byte upstream signon slot 182, which is followed by fifty seven bytes of guard (or "blank") space 184, to complete a sixty-eight byte upstream frame 58. In a currently preferred embodiment, the upstream signon slot 182 includes a five byte preamble 186, a four byte unique serial number (e.g., MAC address) 188 of the responding NT 26, and two bytes FEC information 189, respectively. The preamble 186 is used to insure the headend receiver (not shown) can accurately receive and read the data contained in the upstream signon slot 182. Because there is no previously established synchronization between the headend 22 and the respective NT 26, each NT 26 is preferably assigned with a preset transmission delay to correspond with a selected "maximum" transmission delay assigned by the HEMAC 28 (explained in further detail below), so that transmission of a signon slot by a respective NT 26 does not interfere with a previously transmitted upstream frame 58 by another NT. Further, the guard time 184 following the upstream signon slot is included to help insure the signon slot 182 does not interfere with an ensuing upstream data frame 58 transmitted by another NT 26. For this reason, no upstream payload data is transmitted along with the upstream signon slot 182.

Referring again back to FIG. 5 in conjunction with FIG. 9, the collision feedback data field 80 is used by the HEMAC 28 to provide feedback information to the respective NTs 26 regarding the success or failure of an attempted response to a contention signon permit 180. More particularly, in order to track the successive downstream frames 48, a five bit binary slot number is assigned to each frame, wherein the slot numbering starts over after each successive thirty-two frames (i.e., from slot number "00000" to slot number "11111"). The beginning of a new series of slot numbers is indicated by setting flag 75, so that each NT can easily track the respective downstream frames by monitoring the flag and employing a simple frame counter (not shown). As will be apparent to those skilled in the art, this also allows further downstream communication regarding the results of an upstream transmission to be easily identified, so long as it is transmitted by the HEMAC 28 within thirty-two frame periods since the original downstream permit 180 was transmitted.

If a responsive signon slot 182 is successfully received by the HEMAC 28 (i.e., without an inherent transmission problem or collision occurring between respective NTs attempting a response), the collision feedback data field 80 will identify the slot number (i.e., from 00000 to 11111) of the respective downstream frame 48 containing the signon permit in field 87. The first two-bit collision indicator "CI1" in field 89 is then set to "01", with the remaining five two-bit indicators left at zero. In this manner, the successfully responding NT's MAC 38 (which has stored the corresponding slot number of the frame 48 carrying the contention signon permit 180) will know that its signon slot was received by the HEMAC 28.

In a case where two or more NTs 26 transmit an upstream signon slot 182 in response to the same downstream signon permit 180, the HEMAC 28 will set the collision indicator "CI1" in field 89 to "11", indicating that no signon attempt by any NT 26 was effective. A protocol for re-attempting an upstream response by the respective unsuccessful NTs while attempting to avoid further collisions is preferably employed by the respective NTs 26. Such protocols include many known efficient contention resolution Random Access algorithms (RAA), such as the Ternary Tree Binary Feedback (TTBF) algorithm,, wherein respective NTs are assigned differing priority numbers. Such an algorithm is tailored to systems with a large number of stations and outperforms ALOHA algorithms without suffering from its stability problems. An overview of known contention resolution algorithms is provided in a paper presented to the IEEE Project 802.14 Working Group entitled, "A review of Random Access Algorithms", by Chatschik Bisdikian of IBM, dated January 1996, which is fully incorporated herein by reference.

In situations where multiple upstream frequency channels are used by the network 20, a four bit "channel number" is provided in field 91 by the HEMAC 28 to identify which upstream channel the information in field 80 applies to. A description of the use of the remaining two-bit collision indicators in field 89 is described below in conjunction with FIG. 15.

Figure 10:
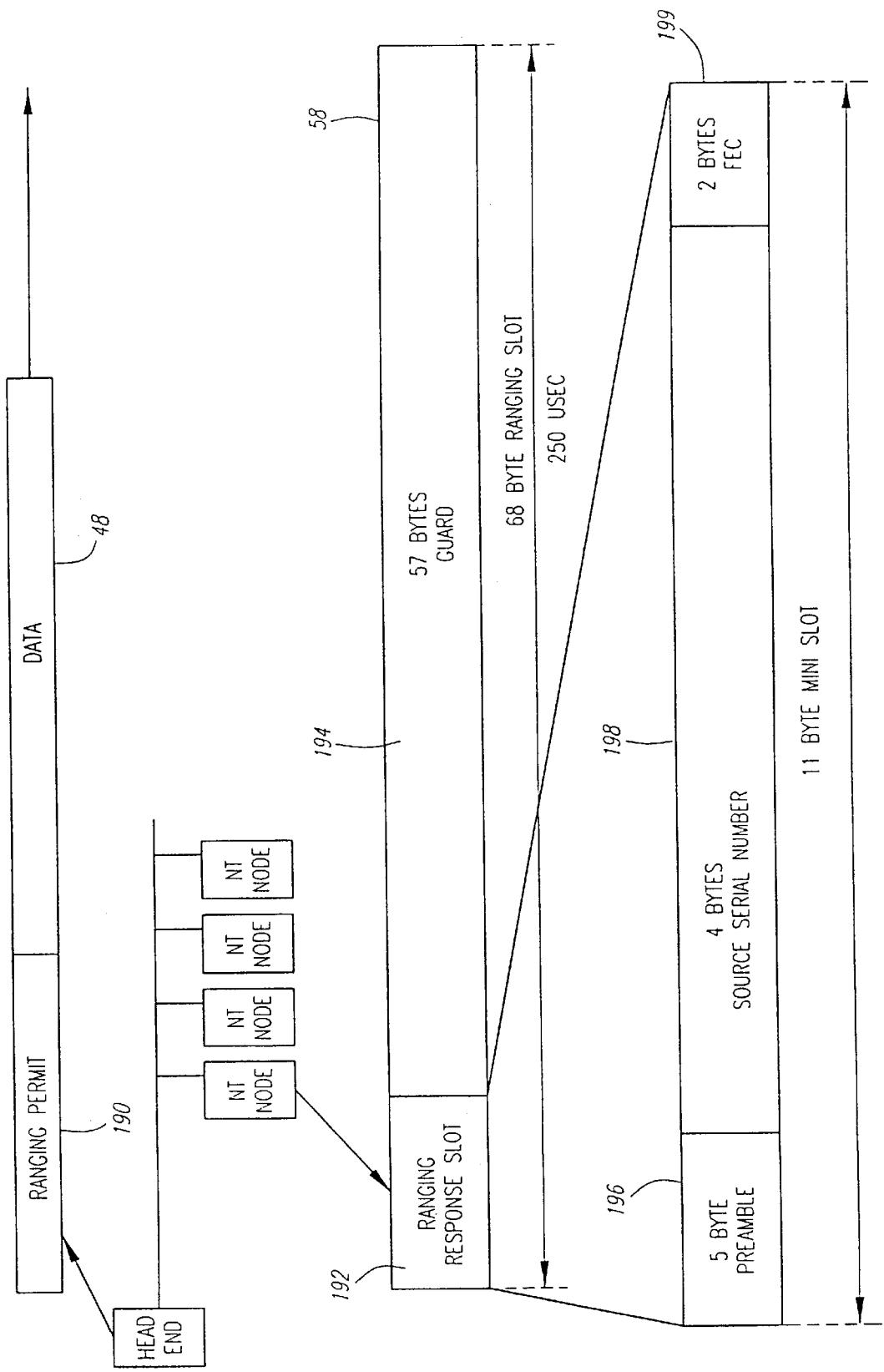
FIG. 10 is a block diagram of a preferred upstream data frame transmitted in response to a ranging permit.

Referring to FIG. 10, where an NT 26 does successfully submit a signon slot 182 to the HEMAC 28, it assumes the particular twelve bit NT ID transmitted in the particular downstream signon permit 180. The HEMAC then transmits a "ranging permit" 190 to the respective NT 26 in order to determine (and subsequently adjust) the round trip transmission interval between the two units. In particular, the ranging permit 190 is addressed only to the specific NT 26, by way of the 12 bit permit ID field 85. Thus, there is no "contention" situation between respective NTs 26, as only the specifically identified NT may respond.

To respond to a ranging permit 190, the polled NT 26 transmits an eleven byte ranging slot 192, followed by fifty seven bytes of guard space 194. The ranging slot 192 includes a five byte preamble 196, the four byte unique serial number 198 for the respective NT 26, and two bytes FEC information 199, respectively. The HEMAC 28 tracks the time between when it transmits the downstream ranging permit 190 and when it receives the responsive ranging slot 192 from the respective NT 26 and compares the round trip transmission time against the currently existing maximum delay time and calculates the difference in order to set the proper delay for the respective NT 26. The respective delay information is then transmitted to the particular NT 26 as part of the OAM provisioning data contained in an ensuing downstream data frame 48.

Figure 11:
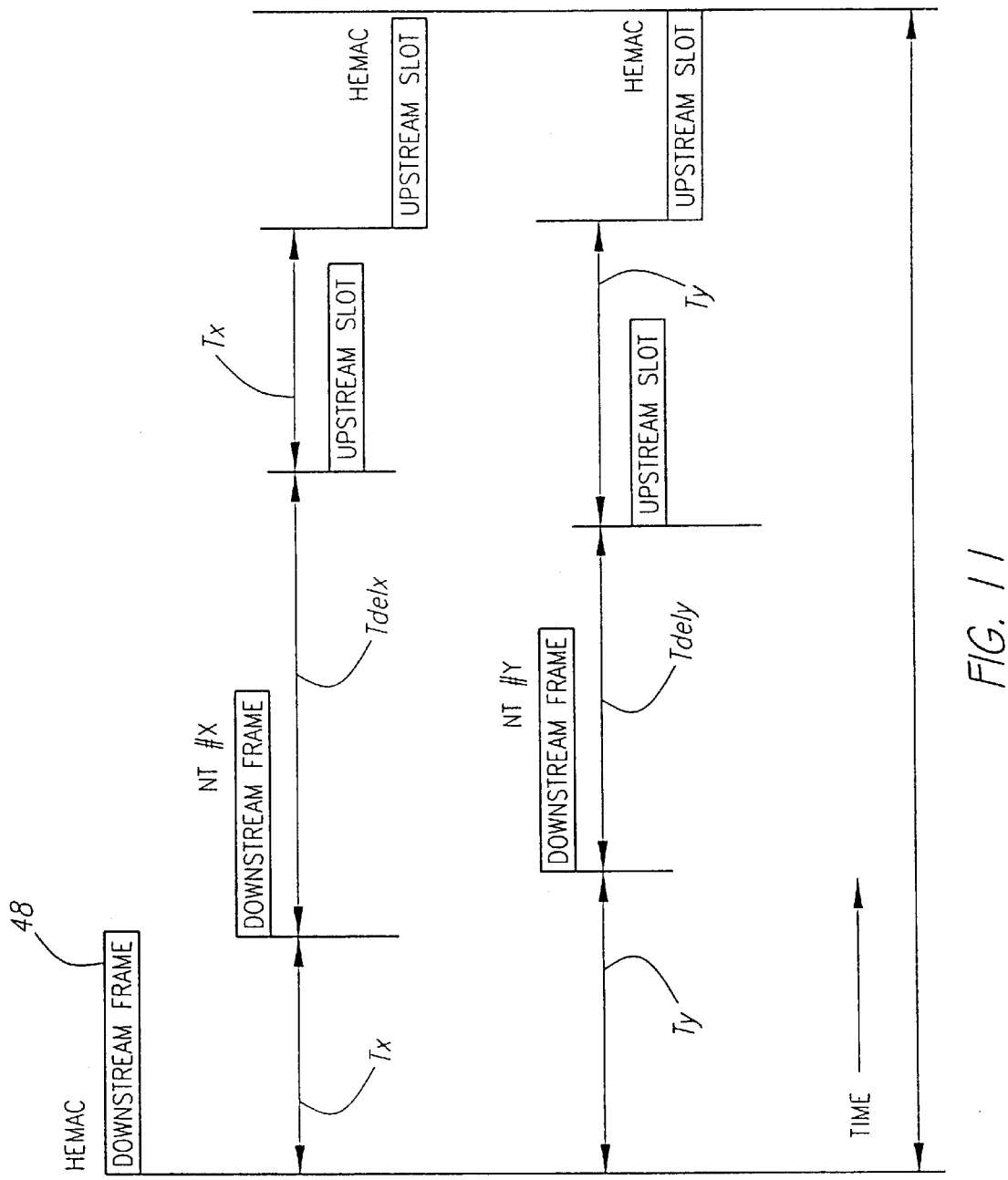
FIG. 11 is a timing diagram illustrating a preferred network terminal transmission delay protocol.

By way of illustration, referring to FIG. 11, a downstream frame 48 is transmitted from the headend 22 and is received at NT#x after a transmission interval of $T_x$, and is received at NT#y after a transmission interval of $T_y$. NT#x imposes a delay of $T_{delx}$, and NT#y imposes a delay of $T_{dely}$, respectively, before each transmits a respective upstream response, e.g., to a contention permit contained in the respective downstream frame. Based on the ranging permit process, the HEMAC sets the respective delays, $T_{delx}$ and $T_{dely}$, such that the total round trip transmission time is the same for both NT#x and NT#y, i. e., $2T_x+T_{delx}=2T_y+T_{dely}$. In this manner, all upstream frames 58 will arrive serially at the headend 22, regardless of the differences in round trip transmission times between respective NTs 26. Where the transmission interval of a respective NT 26 is found to exceed the previous maximum delay time, the HEMAC will accordingly update each of the NTs 26 with a compensating delay value equal to or greater than the new maximum network terminal delay interval.

Because the initial transmission delay for receiving a response to either a contention signon permit 180 or ranging permit 190 is not known, a number of "blanking slots" (not shown) are preferably inserted following the transmission of either one of these permits. A blanking slot is simply a non-transmitting, or "quiet" period, equal in length to the normal frame interval timing (i.e., 250 μsec). In this manner, the responding NTs 26 to a signon permit 180 or ranging permit 190 are afforded an additional time interval for their upstream transmission to reach the head-end 22, without interfering with an ensuing upstream response to a subsequent permit from a closer NT.

Further, where the respective round trip transmission time of a particular NT 26 exceeds the total frame transmission slot time (i.e., 250 μsec in the illustrated preferred embodiments), no further delay can be accommodated, since this will cause interference between sequential adjacent upstream frames 58. Instead, one or more blanking slots must be permanently inserted by the HEMAC 28 following each downstream frame 48 transmission in which one or more such "long distance" NTs are eligible to respond. In order to maintain efficient utilization of network bandwidth, however, the respective NTs 26 of a preferred network 20 should be sufficiently close to the headend 22 so that the number of blanking slots required to insure receipt of signon and ranging responses does not cause overall network bandwidth utilization to suffer.

Figure 12:
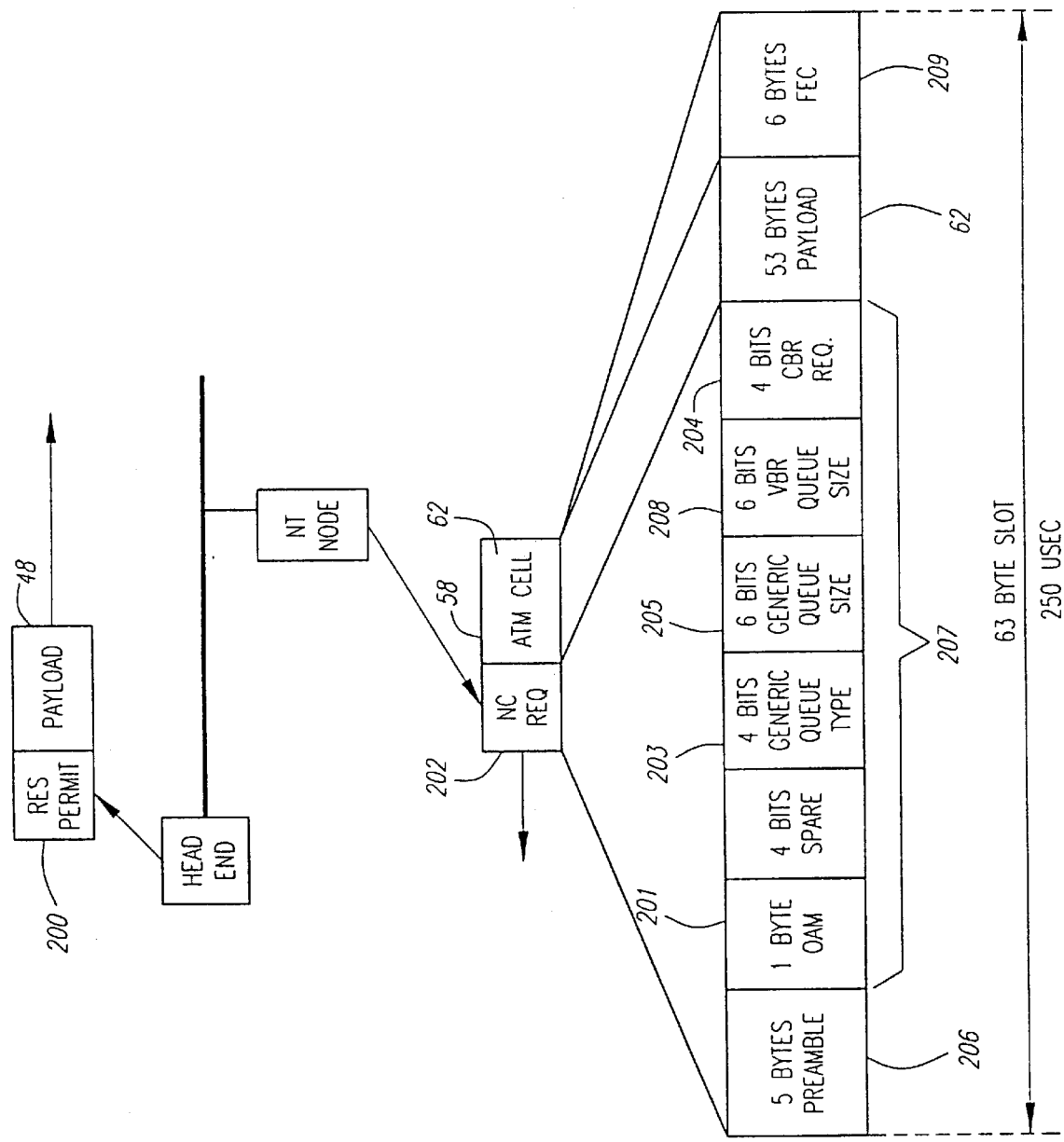
FIG. 12 is a block diagram of a preferred upstream data frame transmitted in response to an reservation mode permit.

Referring to FIG. 12, in further accord with a general aspect of the invention, the HEMAC 28 will periodically transmit a reservation mode permit 200, which allows for the upstream transmission of an ATM payload cell 62 by a specific NT 26. The HEMAC 28 identifies the permit type as being "reservation mode" by a selected code in the permit type field 81 of the downstream permit 200, with the particular NT 26 being identified in the 12 bit permit ID field 85.

The specified NT 26 responds to the reservation mode permit 200 by transmitting an upstream data frame 58 containing a non-contention request slot 202, followed a fifty-three byte ATM payload cell 62 and six bytes of FEC information 209, respectively. The non-contention request slot 202 includes a five byte preamble 206 and a four byte non-contention request 207. The non-contention request 207 includes contains a one byte OAM field 201, four bits spare, a four bit "generic queue type" field 203, a six bit "generic queue size" field 205, a six bit "VBR queue size" field 208, and a four bit "CBR request" field 204, respectively. As explained in greater detail below in conjunction with FIGS. 16–17, the VBR queue size field 208 is used by the NTMAC 38 to inform the HEMAC 28 of the number of ATM payload cells 62 it has waiting in its VBR queue (shown in FIG. 16). The generic queue size field 205 is used by the respective NTMAC 38 to inform the HEMAC 28 of the number of ATM payload cells 62 it has waiting in a given queue of a service type indicated by a selected code in the generic queue type field 203. The CBR request field 204 is used by the respective NT MAC 38 to request CBR bandwidth for up to four CBR connections—, i.e., wherein each respective bit is used to indicate whether an associated telephone line or connection at the respective NT 26 is "off-hook".

Figure 13:
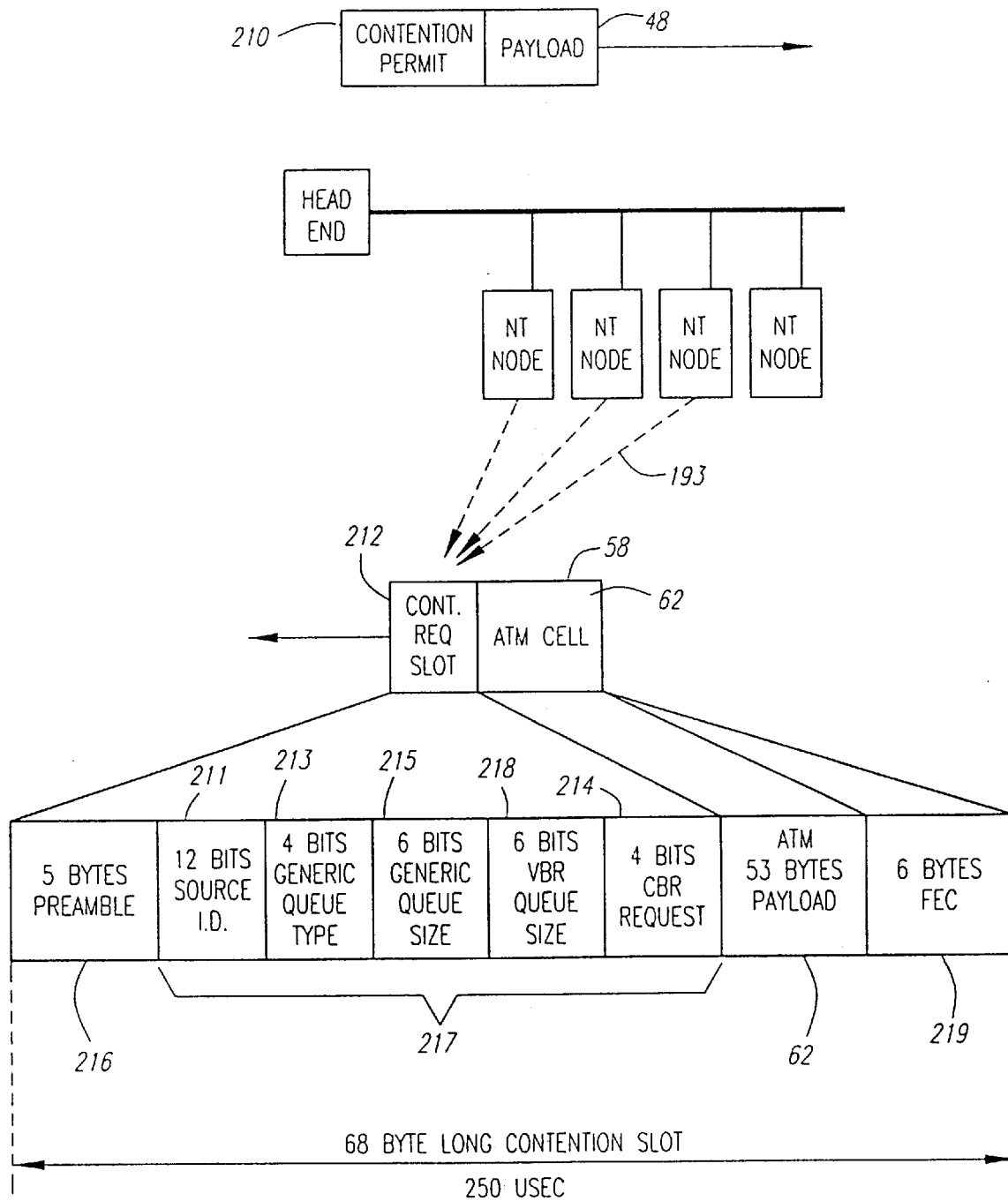
FIG. 13 is a block diagram of a preferred upstream data frame transmitted in response to a contention mode permit.

Referring to FIG. 13, the HEMAC 28 may also periodically transmit a contention mode permit 210, which allows for the upstream transmission of an ATM payload cell 62 by a responsive NT 26, but is "contention based," so that any NT 26 may respond, as indicated by dashed lines 193. The HEMAC 28 identifies the permit type as being "contention mode" by a selected code in the permit type field 81 of the downstream permit 200. In a presently preferred embodiment, the HEMAC may designate either one or more particular groups of NTs 26, or all NTs 26, as being eligible to respond to the contention mode permit 210, by inserting a particular 12 bit group code in the permit ID field 85.

An NT 26 responds to a contention based ATM permit 210 by transmitting an upstream data frame 58 containing a "contention request" slot 212 followed a fifty-three byte ATM payload cell 62 and six bytes of FEC information 219, respectively. The contention request slot 212 includes a five byte preamble 216 and a four byte contention request 217. The contention request 217 includes a twelve bit source ID field 211, a four bit generic queue type field 213, a six bit generic queue size field 215, a six bit VBR queue size field 218, and a four bit CBR request field 214, respectively. The respective generic queue type field 213, generic queue size field 215, VBR queue size field 218, and CBR request field 214 are used in an identical manner as fields 203, 205, 208 and 204, respectively, of a non-contention request—i.e., a contention request 217 is the same as a non-contention request 207, except that the twelve OAM/spare bits of the later are used as a source I.D. field 211 in the former for a inserting a responding NT's MAC address.

In a presently preferred embodiment, the collision feedback data field 80 is used by the HEMAC 28 to provide feedback information to the respective NTs 26 regarding the success or failure of an attempted response to a contention mode permit 210 in the exact same manner as with the contention signon response slots 182 described above in conjunction with FIG. 9. In the case where two or more NTs 26 transmit an upstream contention request slot 212 in response to the same downstream contention mode permit 210, the HEMAC 28 will set the collision indicator "CI1" in field 89 to "11", indicating that no ATM payload cell 62 was received and that retransmission is required, e.g., in accordance with the afore-described RAA algorithms. Again, in situations where multiple upstream frequency channels are employed by the network 20, a four bit "channel number" is provided in field 91 by the HEMAC 28 to identify which upstream channel the information in field 80 applies to.

Figure 14:
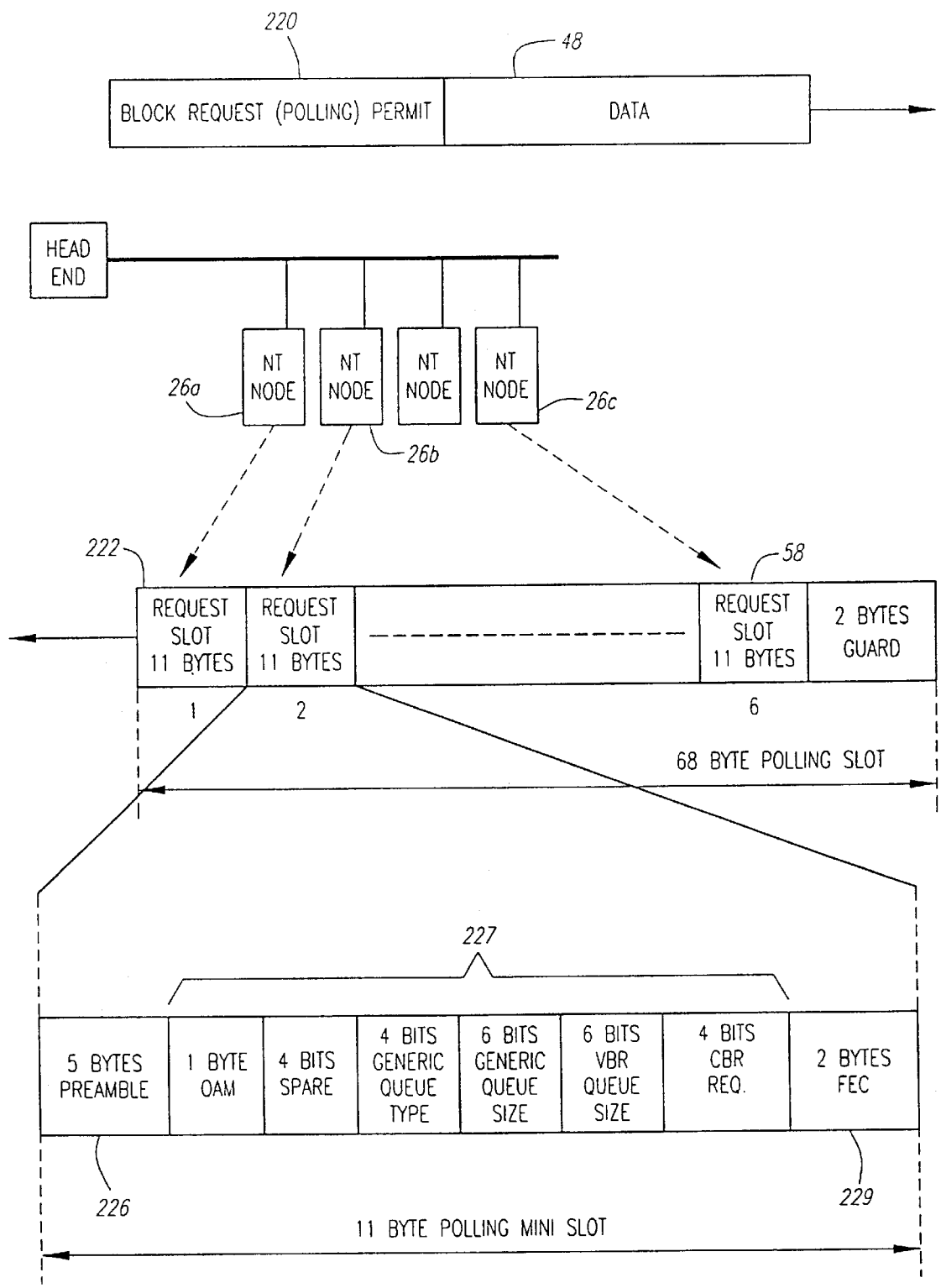
FIG. 14 is a block diagram of a preferred upstream data frame transmitted in response to a block request polling permit.

Referring to FIG. 14, the HEMAC 28 may also periodically transmit a "block request" polling permit 220, which polls up to six different NTs 26 on an individual (i.e., reservation mode) basis, to allow for each designated NT 26 to send an eleven byte upstream "mini request slot" 222 in a respective reserved request slots 222. The HEMAC 28 identifies the permit type as being a "block request" by a selected code in the permit type field 81 of the downstream permit 220. In a presently preferred embodiment, the HEMAC 28 assigns (e.g., by way of provisioning information sent in past OAM data fields) each NT 26 to belong to one or more "polling groups" of up to six NTs. Each NT 26 in a particular polling group is also assigned a "mini slot" position number, i.e., from one to six.

To respond to the block request permit 220, the selected NTs of the polling group identified by a selected code in the 12 bit permit ID field 85 each transmit an eleven byte mini request slot 222 in its selected slot position. By way of example, in the preferred embodiment depicted in FIG. 14, NTs 26a, 26b and 26c each belong to a selected polling group, wherein NT 26a is assigned to mini slot 1, NT 26b is assigned to mini slot 2 and NT 26c is assigned to mini slot 6, respectively, for their respective response transmission, wherein the total transmission interval of the mini slots is equal to the total 250 usec upstream frame interval. In a presently preferred embodiment, each NT MAC 38 is provided with a separate delay counter for determining its transmission slot timing, in addition to the afore-described transmission delay of the respective NT 26 due to its distance from the headend 22.

Each mini request slot 222 includes a five byte preamble 226 followed by a four byte request 227 that is identical to a non-contention request slot 207 (described above in conjunction with FIG. 12) and two bytes FEC 229. As will be apparent to those skilled in the art, the twelve bit ID of the respective NTs is not required, since the HEMAC 28 already knows which NTs 26 are responding in each mini slot.

Figure 15:
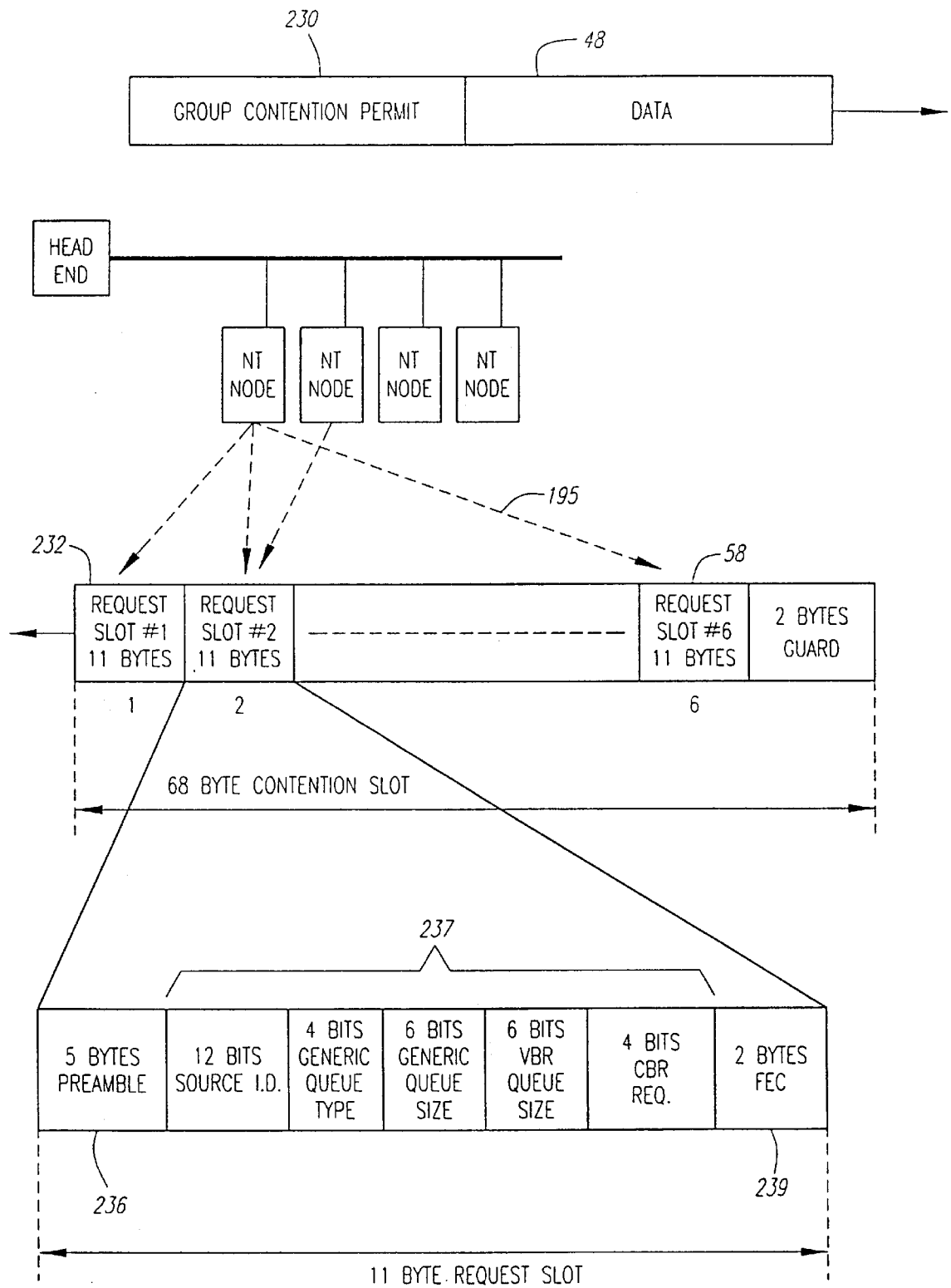
FIG. 15 is a block diagram of a preferred upstream data frame transmitted in response to a group contention permit.

Referring to FIG. 15, to accommodate a greater number of upstream communication requests without having to poll each NT 26, the HEMAC 28 may also periodically transmit a "group contention permit" 230, which allows any NT of a specified group to send an upstream request contained in a respective eleven byte, "mini contention request" slot 232. In a presently preferred embodiment, each NT 26 of the specified group is allowed to contend for any one of up to six respective mini slot positions of a responsive upstream frame 58, as indicated by the dashed line 195, although it may only contend for a single mini slot position, per group contention permit 230. The eleven byte contention request slot 232 is identical to the afore-described eleven byte contention mode request slot 217, including a twelve bit source ID field. As with the afore-described reservation mode polling requests 222, however, no upstream data is transmitted.

In a presently preferred embodiment, the collision feedback data field 80 is used by the HEMAC 28 to provide feedback information to the respective NTs 26 regarding the success or failure of an attempted response to a group contention permit 230 in substantially the same manner as with the contention request and signon response slots 212 and 182, respectively, as described above in conjunction with FIGS. 9 and 13. However, because there are actually six mini slots being contended for by the responding NTs 26, each of the six, two-bit collision indicator fields 89 (i.e., CI1–CI6, respectively (seen in FIG. 5) are used. In particular, if there is a collision detected in any of the six mini slots, the HEMAC 28 will set the collision feedback field for the respective channel and populate each of the respective collision indicator fields 89, as follows: if the respective mini slot was empty (i.e., "no carrier") the field is set to "00"; if a mini contention request slot 232 is successfully received in a respective mini slot, the field is set to "01"; and if there is a collision in a respective mini slot, the respective field is set to "11", indicating that no request 232 was received in that particular mini slot and that retransmission is required, e.g., in accordance with the afore-described RAA algorithms. Again, in situations where multiple upstream frequency channels are employed by the network 20, a four bit "channel number" is provided in field 91 by the HEMAC 28 to identify which upstream channel the information in the collision feedback field 80 applies to.

Block request permits 220 or group contention permits 230 are preferably issued by the HEMAC 28 on a regularly scheduled basis to better ensure upstream transmission access to all NTs.

Figure 16:
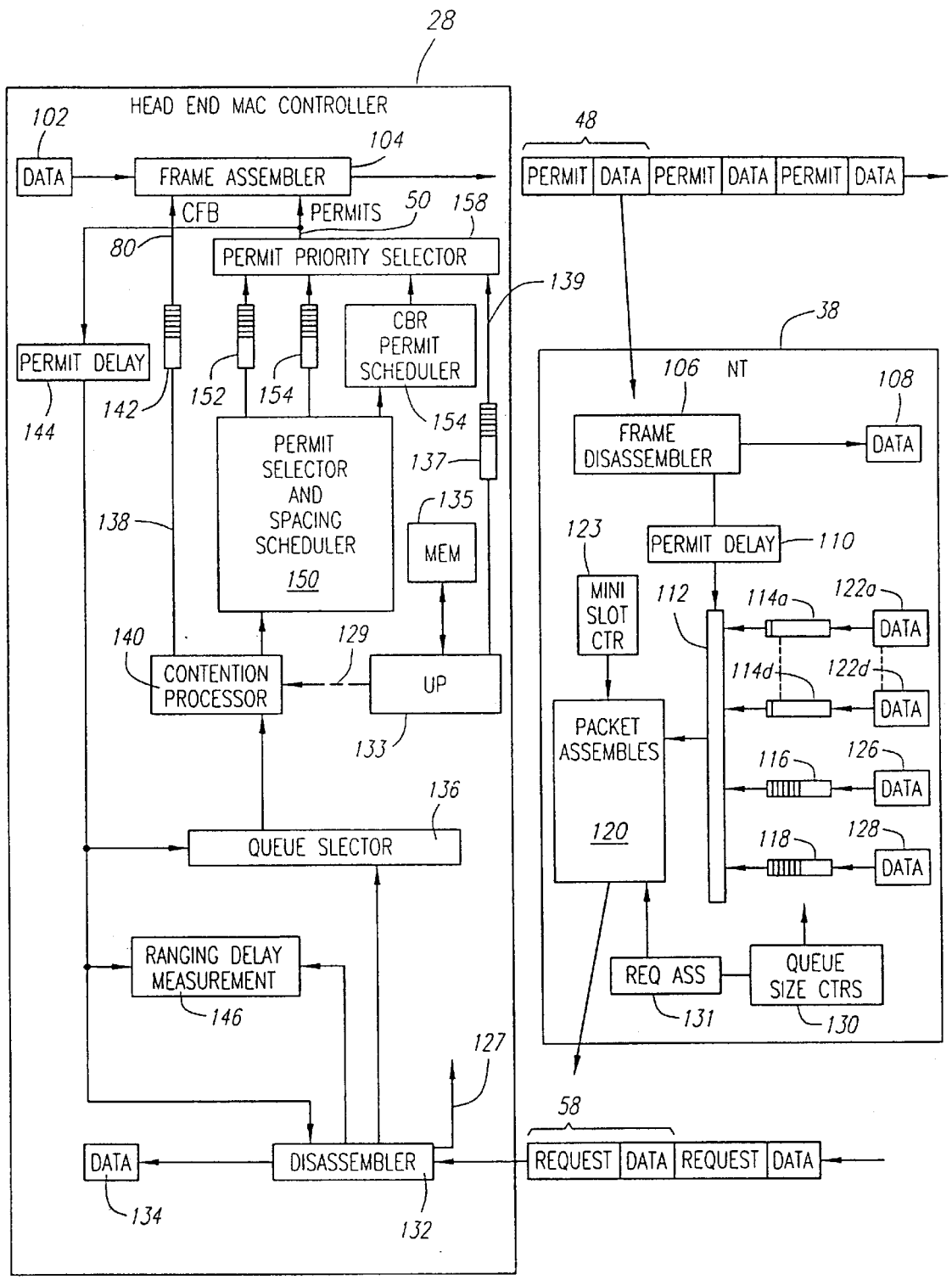
FIG. 16 is a functional block diagram of the respective headend and network terminal MAC controllers, illustrating the process for controlling the transmission and receipt of the respective downstream permits and upstream request slots.

Referring to FIG. 16, the HEMAC 28 receives one or more downstream digital data streams 102 from various data service interfaces such as, e.g., POTS telephony interface 30, ATM interface 32 and LAN interface 34, respectively, (shown in FIG. 1) for transmission to the respective NTs 26. The respective data streams 102 are fed into a frame assembler 104, which, in accordance with the afore-described framing protocol described in conjunction with FIGS. 3–8, assembles the received data into respective downstream data frames 48 for transmission over the coaxial distribution network 24. The assembler 104 also receives periodic contention feedback data, referred to generally in FIG. 16 as the contention feedback data field "80" described above in the text accompanying FIG. 5, and successive upstream bandwidth permits, referred to generally in FIG. 16 as the permits 50 described above in the text accompanying FIG. 2, for inclusion in the MAC control information (e.g., subframe 76 in FIG. 5) of the respective downstream data frames 48.

As each downstream data frame 48 is received by a respective NT 26, the frame 48 is input into a dissembler 106 located in the NT MAC 38. If it is an intended recipient of the data contained therein, the disassembler 106 strips off the framing overhead and parses the downstream data 108 into respective data streams for further processing (not shown) by the NT MAC 38. The frame disassembler 106 also recovers the respective permit 50 in the MAC control overhead of the downstream frame 48—i.e., pertaining to the upstream frequency channel assigned to that NT 26. The NT MAC 38 then evaluates the respective permit 50 by reading the respective permit type and ID fields and, if a response is either required or desired, the recovered permit 50 is input into a ranging delay circuit 110. In a manner described above in conjunction with FIGS. 10–11, the ranging delay circuit 110 delays the permit within the NT MAC 38 for a preset period of time, such that the responsive upstream transmission of a response slot is serially coordinated with the upstream frame interval timing. Following the delay period, the permit 50 is input into an upstream transmission controller 112. Upon receipt of the permit, the controller 112 immediately triggers the upstream transmission of a responsive upstream data frame 58 by a packet assembler 120, depending upon the type of upstream response called for by the respective permit (50).

More particularly, within the NT MAC 38 are a plurality of ATM cell queues, including CBR queues 114a–d, VBR queue 116 and UBR queue 118, respectively, wherein respective upstream data streams are serially assembled into successive ATM cells 62 in the respective queues. In the illustrated preferred embodiment of FIG. 16, CBR queues 114a–d assemble respective ATM cells 62 containing CBR service data representing synchronous telephony PCM data from corresponding telephony channels 122a–d. VBR queue 116 assembles and, depending on network traffic conditions, stores ATM cells (62) containing digital VBR service data. Likewise, UBR queue 118 assembles and, as necessary, stores ATM cells (62) containing digital UBR service data. As will be apparent to those skilled in the art, any number of service type ATM cell queues may be used by the NT MAC 38 in accordance with the transmission protocol methodology provided herein, limited only by the available upstream bandwidth of the particular upstream channel assigned to the respective NT 26.

Respective upstream request slots are populated as follows:

When responding to all reservation or contention mode permits other than signon or ranging permits, queue size counters 130 monitor the respective VBR and UBR service queues 116 and 118, tracking the number of pending ATM cells awaiting upstream transport in each respective service type queue. The counters provide an updated cell count to a request slot assembler 131 for each respective service type queue. The request slot assembler 131 uses this information to populate respective "queue size" fields in the next outgoing request slot. In the illustrated preferred embodiment of FIG. 16, the "generic queue" fields (e.g., fields 203/205 and 213/215 of FIGS. 12 and 13) in the respective upstream request slots (i.e., slots 202, 212, 222 and 232 of FIGS. 12–15) are used to transmit the queue size of the UBR queue 118, with the "generic type" field containing a code indicating "UBR" service. In alternate preferred embodiments, the respective "generic queue" fields of the upstream requests may be alternately used by the NT MAC 38 to send information to the HEMAC 28 regarding any number of different service type queues, either on a dedicated or alternating basis, depending upon available upstream bandwidth and service type priority. Because of its relatively high service level priority, VBR services are preferably given a dedicated queue field in the upstream requests.

A CBR service monitor (not shown) monitors telephony channels 122a–d for activity—e.g., such as an initial off-hook detection—and reports the status of each telephony channel to the request slot assembler 131. This information is used to populate the "CBR request" field (e.g., fields 204 and 214 of FIGS. 12 and 13) of the upstream requests. For example, in a presently preferred embodiment, each of the four bits of the CBR request fields is assigned to a corresponding telephony channel 112a–d. In each upstream request slot, the request slot assembler 131 sets the respective bit of the CBR request field to "1" if the corresponding telephony channel is active and otherwise sets each bit to "0". In alternate preferred embodiments, the generic queue fields may be used to send status information regarding further CBR telephony channels. As explained in greater detail below, CBR traffic requires very low CDV. As such, CBR queues 114a–d preferably store no more information than the data of a cell currently being assembled.

For all upstream requests, including signon and ranging permits (i.e., permits 180 and 190 of FIGS. 9 and 10), the respective NT ID information for the request slots is preferably supplied directly by the packet assembler 120. A "mini slot" timing counter 123 is employed to add a further calculated delay to upstream frame transmission in cases where a mini request slot is being transmitted in response to a group contention or polling permit (i.e., permits 220 and 230 of FIGS. 14 and 15). As with the ranging delay circuitry 110, the delay value of circuit 123 is supplied by the HEMAC 28 by way of OAM provisioning data.

The respective upstream data frames 58 are received by the HEMAC 28 and input into a frame disassembler 132, which strips the respective request slot(s) from any data 134 and/or OAM information (not shown) contained in an appended ATM cell. In accordance with a more particular aspect of the invention, a copy of each permit 50 input into the downstream frame assembler 104 is delayed by respective HEMAC delay circuitry 144, and input into the frame disassembler 132, respectively. The HEMAC delay circuitry 144 delays the each successive permit 50 to match to overall round-trip transmission timing of network 20—i.e., such that each respective permit 50 will arrive at the frame disassembler 132 at the same time as the responsive upstream request slot.

Depending on the respective permit type and responsive request slot, the frame disassembler 132 will extract the pertinent data contained in each received request slot and pass it into a first queue selector 136, for further processing by the HEMAC 28. In cases where a reservation mode permit was issued—i.e., either a ranging permit 90, regular reservation permit 100, or a group polling permit 120, respectively—the disassembler 132 must first append the respective network terminal ID information from the permit 50 to the received request slot. In this manner, all requests received by the queue selector 136 (excepting signon and ranging slots 182 and 192) will contain the same data fields, regardless of whether the slot was originally in response to a contention or reservation mode permit.

For received signon slots 182, the disassembler 132 transmits the four byte NT ID field directly to an internal HEMAC processor 133. If a four byte ID was successfully received, the processor 133 stores the information in an associated memory 135 and issues an ensuing ranging permit. The processor 133 also issues a feedback message 129 regarding the success (or lack there of) of the response for placement in the pertinent collision feedback data field of an ensuing downstream data frame 48, via a contention processor 140 (described below).

Where a ranging response slot 192 is received, the disassembler stops a ranging delay measurement clock 146, which was activated by the respective permit 50. The overall transmission time is then relayed from the clock 146 to the processor 133 for further handling as described above.

For all other received request slots, the HEMAC performs the following processing steps:

With respect to contention requests, (i.e., contention requests 217 and 227 in FIGS. 13 and 15, respectively), the queue selector 136 attaches the downstream frame transmission slot number of the respective permit (i.e., as described above in conjunction FIGS. 5 and 9) to the responsive request data and then transmits the respective requests into a contention request processor 140. The contention request processor 140 reads the respective data fields in each request to determine if (1) a response was successfully received, (2) a collision occurred, or (3) no response was received at all (i.e., no carrier), and generates feedback data 138 for a corresponding collision information field (80). If a contention request was successfully received, the contention processor 140 inputs the request into a permit selector and spacing processor 150. In all cases, the generated feedback data is forwarded to a collision feedback data queue 142 for placement by the downstream frame assembler 104 into the respective MAC overhead field corresponding to the upstream frequency channel, e.g., data field 80, of an ensuing downstream data frame 48.

Non-contention requests (i.e., requests 207 and 227 in FIGS. 12 and 14, respectively) are fed directly from the queue selector 136 into the permit selector and spacing processor 150.

Figures 17, 18:
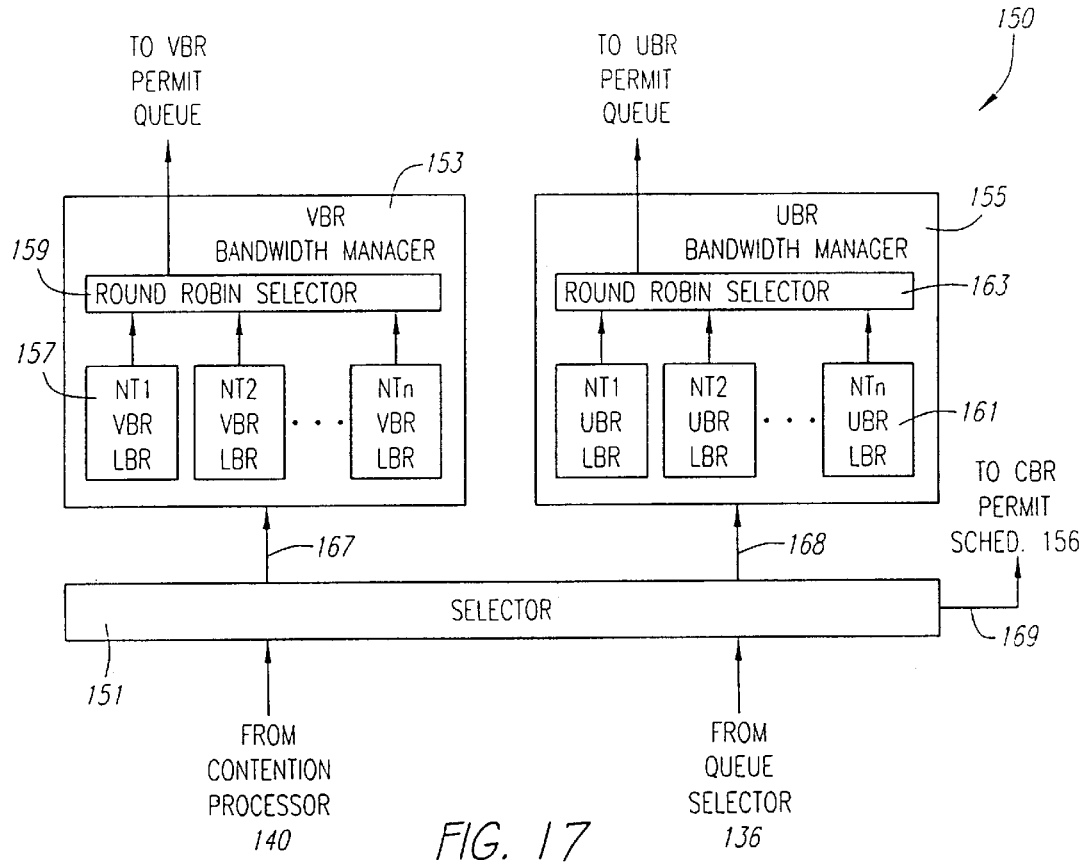
FIG. 17 is a functional block diagram of the permit selector and spacing processor of the headend controller of FIG. 16.
FIG. 18 is a CBR permit scheduler table employed by the headend controller of FIG. 16.

Referring to FIG. 17, all requests input into the permit selector and spacing processor 150 are first processed by a selector circuit 151, which separates the requests based on service type and NT ID. In particular, VBR queue information 167 is parsed into a VBR bandwidth manager 153, wherein the VBR queue size for of each NT 26 is placed into a respective "leaky bucket register" ("LBR") 157. Likewise, UBR queue information 167 is parsed into a UBR bandwidth manager 155, wherein the UBR queue size for each NT 26 is also placed into a respective LBR 161. CBR request data 169 is parsed directly into a CBR permit scheduler 156.

Within the respective bandwidth managers 153 and 155, permits of the same service priority for different NTs 26 are issued on a "round robin" basis by selectors 159 and 163, respectively. In particular, round robin selector 159 in the VBR bandwidth mgr 153 successively issues a "VBR" type permit into a VBR permit queue 152 for each successive NT LBR 157 having at least one VBR cell in queue. Likewise, round robin selector 163 in the UBR bandwidth mgr 155 successively issues a "UBR" type permit into a UBR permit queue 154 for each successive NT LBR 161 having at least one UBR cell in queue. In this manner, each NT having at least one cell in queue of a respective VBR or UBR service type is given an equal allocation of the available upstream bandwidth for that respective service level, even though other NTs may have a much larger queue size.

Instead, the LBR registers 157 and 161 act as a "gate" for the incoming request information. Whenever a request arrives from a respective NT 26, the associated LBR 157 and 161 are incremented by the number of new cells in each respective service queue. The respective LBRs 157 and 161 are also decremented at a selected mean rate allocated to that particular NT. The individual LBRs 157 and 161 are each defined by a top threshold, or "burst size." So long as the respective LBR queue register is below this threshold, all incoming requests are allowed to into the respective outgoing permit queue 152 or 154. If the threshold is exceeded, however, no further permits are issued until the respective LBR "leaks" below the threshold.

Referring again to FIG. 16, a permit priority selector 158 feeds the respective permits from the VBR and UBR queues 152 and 154, and from the CBR permit scheduler 156, respectively, to the downstream frame assembler 104. Occasional signon and ranging permits (i.e., 180 and 190) issued directly from processor 133 into a separate queue 137 are also input into the downstream assembler 104 frames by priority selector 158. In accordance with another general aspect of the invention, CBR permits from the CBR scheduler 156 are generally given top priority by the priority selector 158, due to the very low CDV that must be maintained for these service. VBR and UBR permits from queues 152 and 154 each take a respective lower priority, with signon and ranging permits from queue 137 typically given the lowest priority.

In accordance with a still further aspect of the invention, scheduling a CBR permits (i.e., in a "scheduled mode") is preferably employed by the CBR scheduler 156 so that the 22 byte upstream telephony slots 242 are received at the headend 22 at intervals of approximately 5.875 msecs, in accordance with standard synchronous telephony standards. In particular, CE telephony ("AAL1") standards requires the "packing" of fortyseven bytes of PCM data from a telephone channel (e.g., from a single DS0 channel such as telephony channels 122a–d received at the NT MAC 28 illustrated in FIG. 16) into each (CBR) ATM cell 62. Because the data arrives at the NT 26 on a one-byte-per 125 usec basis, however, 5.875 msec delay with respect to the first arriving byte is already required to pack each cell. Further, when employing the preferred frame interval timing of 250 usec to transmit the frames upstream to the HEMAC 28, 5.875 msec will not fall on an even time interval—, i.e., of either 5.75 msec based on every twenty-three intervals, or 6.00 msec based on every twenty-four intervals, respectively, in order to avoid further delay in the upstream transmission, the CBR permit scheduler 156 evenly allocate the CBR telephony permits based on a repetitive rotation of forty-seven downstream frames for each respective telephony channel.

More particularly, referring to FIG. 18, to match the AAL1 47 byte fill rate of 5.875 msec (instead of 6 msec for 48 bytes fill), the CBR permit scheduler 158 employs a scheduling table 160 for issuing CBR permits to respective active telephony channels in the respective NTs 26. The scheduling table 160 is employs a looped counter of forty-seven permit timing interval slots 162, i.e., wherein each slot is associated with a respective 250 usec downstream frame interval. For each available timing interval slot 162, a network terminal ID 164 and Call ID channel 166 may be assigned by the CBR permit scheduler 156, based on availability at the time the first "active" flag is set to a "1" in the Call ID field of an incoming request slot from the respective NT 26. The slot assignment is relayed to the respective NT 26 in an ensuing downstream data frame 48, i.e., by OAM provisioning data. The respective NT 26 may thereby assemble its respective ATM cells on a "just-in-time" basis, so that each respective CBR ATM cell is fully packed just as the respective permit arrives from the HEMAC 28.

By way of example, operation of the scheduling table 160 when two active NT Call ID channels are active is shown in FIG. 18. At interval 0002, a CBR permit is allocated for NT #0520, Call ID #1, and at interval 0025, i.e., after 5.75 msec, the next successive permit is issued for NT #0520, Call ID #1. Because the timing interval 162 is looped, the next permit for NT #0520, Call ID #1 will occur again at slot 0002 of the ensuing loop, i.e., after 6.0 msec. By repeating this loop, the CBR telephony permits for NT #0520, Call ID #1 are thus issued at an average interval of 5.875 msec, with a maximum CDV of ±125 usec, which is well within acceptable CDV standards for CBR telephony service. Likewise, at intervals 0023 and 0047, CBR permits are allocated for NT #0003, Call ID #2. Again, because the timing interval 162 is looped, the permits for NT #0003, Call ID #2 are allocated every 5.75 usec and 6.0 usec, respectively, for an average interval of 5.875 msec and a maximum CDV of +125 usec. As will be apparent to those skilled in the art, by effectively dedicating permits to CBR traffic for each assigned timing interval 162, (i.e., for a particular upstream frequency channel), capacity for other services may be restricted. Thus, the allocation of CBR channels for each upstream bandwidth frequency must be carefully selected by the network operator, e.g., based on usage patterns, etc.

While embodiments and applications of this invention have been shown and described, as would be apparent to those skilled in the art, many more modifications and applications are possible without departing from the inventive concepts herein.

For example, although the preferred embodiments disclosed and described herein are directed to a network 20 employing a single downstream channel frequency, as will be apparent to those skilled in the art, as bandwidth capacity needs dictate, an alternate preferred HEMAC may equally be suited to process and distribute downstream data over multiple frequency-divided channels, e.g., where respective NTs 26 are grouped according to downstream, as well as upstream, frequency channels.

Further, upstream bandwidth allocation may be based on several alternative spacing algorithms without departing from general aspects of the invention, such as based on a peak cell rate spacing algorithm or based on an estimation of the cell arrival rate at each network terminal, depending on service level priorities and maximum allowable CDV.

The scope of the disclosed inventions, therefore, are not to be restricted except in the spirit of the appended claims.

What is claimed:

1. A communication network, comprising:
  a headend; and
  a plurality of network terminals in communication with the headend over a shared communication medium,
  wherein the headend transmits successive DVB compatible downstream data frames over the shared communication medium at a downstream frame transmission rate, each downstream data frame including one or more upstream transmission permits, each upstream transmission permit within said downstream data frame identifying an upstream RF carrier channel, each upstream transmission permit being one of a selected plurality of permit types, and
  wherein each of said network terminals receives said downstream data frames and reads the permits contained therein, one or more of said network terminals transmitting an upstream response to the received permit over the identified RF carrier channel, the network terminals collectively transmitting upstream data frames over the RF carrier channel at an upstream frame rate synchronized with said downstream frame rate.

2. The communication network of claim 1, wherein said plurality of permit types includes a first permit type authorizing one or more of said network terminals to transmit an upstream sign-on slot in response thereto.

3. The communication network of claim 2, wherein said plurality of permit types includes a second permit type authorizing an identified network terminal to transmit an upstream ranging slot in response thereto.

4. The communication network of claim 3, wherein the headend assigns a selected upstream transmission delay to said identified network terminal according to a calculated offset based on the time required to receive said upstream ranging slot at the headend.

5. The communication network of claim 3, wherein said plurality of permit types includes a third permit type authorizing the transmission of an upstream data frame in response thereto, said upstream data frame including an ATM payload cell and an upstream bandwidth request.

6. The communication network of claim 5, wherein the upstream bandwidth request includes a first field for identifying a first data queue contained in said identified network terminal and a second field for identifying a number of ATM payload cells contained in the first data queue.

7. The communication network of claim 6, wherein the upstream bandwidth request further includes a third field for identifying a second data queue type at said identified network terminal and a fourth field for identifying a number of ATM payload cells contained in the second data queue.

8. The communication network of claim 5, wherein the third permit type is a reservation mode permit, the reservation mode permit authorizing a specified network terminal to transmit an upstream data frame in response thereto.

9. The communication network of claim 5, wherein the third permit type is a contention mode permit, the contention mode permit authorizing any one of a specified group of network terminals to attempt an upstream data frame transmission in response thereto.

10. The communication network of claim 5, wherein the respective permit types include a fourth permit type authorizing the transmission of a plurality of upstream bandwidth requests from a specified group of network terminals.

11. The communication network of claim 10, wherein each of the plurality of upstream bandwidth requests comprises a first field for identifying a first data queue contained in each responding member of said specified group of network terminals and a second field for identifying a number of ATM payload cells contained in the first data queue.

12. The communication network of claim 10, wherein the fourth permit type is a group reservation mode permit, the group reservation mode permit authorizing each of a number of specified network terminals to transmit an upstream bandwidth request in a preselected time slot of a corresponding upstream data frame.

13. The communication network of claim 10, wherein the fourth permit type is a group contention mode permit, the group contention mode permit authorizing any one of a specified group of network terminals to attempt an upstream data frame transmission in any one of an available plurality of time slots of a corresponding upstream data frame.

14. A communication network, comprising:

a headend; and a plurality of network terminals in communication with the headend over a shared communication medium, wherein the headend transmits successive DVB compatible downstream data frames over the shared communication medium, each downstream data frame including one or more upstream transmission permits, each upstream transmission permit within said downstream data frame being associated with an individual upstream RF carrier channel, wherein each upstream transmission permit is one of a selected plurality of permit types, and wherein each of said network terminals receives said downstream data frames and reads the permits contained therein, and wherein one or more of said network terminals transmits an upstream response to the received permit, and wherein the permit types transmitted in each downstream data frame are selected based on a permit allocation criteria, the permit types including a first permit type for authorizing upstream transmission of relatively high CDV traffic, and a second permit type for authorizing upstream transmission of relatively low CDV traffic.

15. The communication network of claim 14, wherein the permit types include a first permit type for authorizing upstream transmission of relatively low CDV traffic, and a second permit type for authorizing upstream transmission of relatively high CDV traffic.

16. The communication network of claim 15, wherein the permit types transmitted in each respective downstream data frame are selected based on a permit allocation process, the permit allocation process including a first criteria for issuing permits of the first type on a scheduled mode basis, and a second criteria for issuing permits of the second type on a round robin basis.

17. The communication network of claim 16, wherein the first criteria for issuing permits of the first type is based on a schedule table, wherein respective permits for a specific traffic channel of a specific network terminal are alternately issued every 5.75 msec and 6.0 msec, respectively, such that a permit for a selected channel of a selected network terminal is issued at an average interval of 5.875 msec.

18. A communication network, comprising:

a headend; and a plurality of network terminals in communication with the headend over a shared communication medium, wherein the headend transmits successive DVB compatible downstream data frames over the shared communication medium, each downstream data frame including an upstream transmission permit associated with an upstream RF carrier channel, wherein the permit transmitted in each respective downstream data frame is selected based on a permit allocation criteria, and include a first permit type for authorizing upstream transmission of relatively high CDV traffic, and a second permit type for authorizing upstream transmission of relatively low CDV traffic, wherein permits of the second type include both reservation mode permits and contention mode permits, respectively and wherein the permit type transmitted in each respective downstream data frame is selected based on a permit allocation process, the permit allocation process including a first criteria for issuing permits of the first type on a scheduled mode basis, and a second criteria for issuing permits of the second type on a round robin basis.

19. The communication network of claim 18, wherein each of the reservation mode permits authorizes a specified network terminal to transmit an upstream bandwidth request in response thereto, and wherein each of the contention mode permits authorizes one or more of a specified group of network terminals to attempt an upstream transmission of an upstream bandwidth request in response thereto, and wherein an upstream bandwidth includes a first field for identifying a first data queue contained in the transmitting network terminal and a second field for identifying a number of ATM payload cells contained in the first data queue.

20. The communication network of claim 18, wherein the first criteria for issuing permits of the first type is based on a schedule table, wherein respective permits for a specific traffic channel of a specific network terminal are alternately issued every 5.75 msec and 6.0 msec, respectively, such that a permit for a selected channel of a selected network terminal is issued at an average interval of 5.875 msec.

* * * * *